US 9,148,329 B1

United States Patent
Gay et al.

(10) Patent No.: US 9,148,329 B1
(45) Date of Patent: Sep. 29, 2015

(54) RESOURCE CONSTRAINTS FOR REQUEST PROCESSING

(75) Inventors: David Edward Gay, Oakland, CA (US); Alfred R. K. Fuller, San Carlos, CA (US)

(73) Assignee: GOOGLE INC., Mountain View, CA (US)

( * ) Notice: Subject to any disclaimer, the term of this patent is extended or adjusted under 35 U.S.C. 154(b) by 380 days.

(21) Appl. No.: 13/431,906

(22) Filed: Mar. 27, 2012

Related U.S. Application Data

(60) Provisional application No. 61/565,425, filed on Nov. 30, 2011.

(51) Int. Cl.
  G06F 15/173 (2006.01)
  H04L 29/06 (2006.01)
  H04L 29/08 (2006.01)

(52) U.S. Cl.
  CPC .......... *H04L 29/06* (2013.01); *H04L 29/08144* (2013.01)

(58) Field of Classification Search
  CPC .......................... H04L 29/06; H04L 29/08144
  USPC ......................................................... 709/226
  See application file for complete search history.

(56) References Cited

U.S. PATENT DOCUMENTS

| | | | |
|---|---|---|---|
| 4,325,120 A | 4/1982 | Colley et al. | |
| 4,779,194 A | 10/1988 | Jennings et al. | |
| 4,796,178 A | 1/1989 | Jennings et al. | |
| 5,325,522 A | 6/1994 | Vaughn | |
| 5,381,546 A | 1/1995 | Servi et al. | |
| 5,560,007 A | 9/1996 | Thai | |
| 5,745,890 A | 4/1998 | Burrows | |
| 6,105,019 A | 8/2000 | Burrows | |
| 6,108,748 A | 8/2000 | Ofek et al. | |
| 6,269,382 B1 | 7/2001 | Cabrera et al. | |
| 6,289,334 B1 | 9/2001 | Reiner et al. | |
| 6,341,302 B1 | 1/2002 | Celis | |
| 6,370,539 B1 * | 4/2002 | Ashby et al. | 701/532 |
| 6,963,869 B2 | 11/2005 | Burrows | |
| 7,043,469 B2 | 5/2006 | Goralwalla et al. | |
| 7,058,949 B1 | 6/2006 | Willen et al. | |
| 7,155,716 B2 | 12/2006 | Hooman et al. | |
| 7,243,351 B2 | 7/2007 | Kundu | |
| 7,246,353 B2 | 7/2007 | Forin et al. | |

(Continued)

OTHER PUBLICATIONS

Ben-Gan, Descending Indexes, Index Ordering, Parallelism, and Ranking Calculations, SQL Server Pro, May 24, 2010, 7 pgs.

(Continued)

*Primary Examiner* — Chris Parry
*Assistant Examiner* — Weiwei Stiltner
(74) *Attorney, Agent, or Firm* — Morgan, Lewis & Bockius LLP

(57) ABSTRACT

A server system having one or more processors and memory receives a first request from an application and processes at least a portion of the first request in accordance with a predefined set of resource constraints. In accordance with a determination that the predefined set of resource constraints has been met prior to completing processing the first request, the server system terminates processing of the first request prior to completing processing of the first request, generates a first intermediate result; and provides a response to the application. The response includes the first intermediate result, and request status information enabling the application to request resumption of the first request.

21 Claims, 13 Drawing Sheets

(56) References Cited

U.S. PATENT DOCUMENTS

| | | | |
|---|---|---|---|
| 7,406,460 B2 | 7/2008 | Burrows | |
| 7,467,163 B1 | 12/2008 | Dodds et al. | |
| 7,516,456 B2 | 4/2009 | Aguilar, Jr. et al. | |
| 7,689,550 B2 | 3/2010 | Lee et al. | |
| 7,801,864 B2 | 9/2010 | Prahlad et al. | |
| 8,099,422 B2 | 1/2012 | De Bellis | |
| 8,131,680 B2 | 3/2012 | Prahlad et al. | |
| 8,185,899 B2 | 5/2012 | Daly et al. | |
| 8,392,408 B1 * | 3/2013 | Fuller | 707/721 |
| 8,468,167 B2 | 6/2013 | Sathyanarayana et al. | |
| 8,560,509 B2 | 10/2013 | Xia et al. | |
| 8,635,621 B2 | 1/2014 | Levitan et al. | |
| 2003/0088715 A1 | 5/2003 | Chaudhuri et al. | |
| 2003/0140035 A1 | 7/2003 | Burrows | |
| 2004/0030970 A1 | 2/2004 | Chen et al. | |
| 2004/0167873 A1 * | 8/2004 | Dettinger et al. | 707/2 |
| 2004/0167904 A1 | 8/2004 | Wen et al. | |
| 2004/0243569 A1 | 12/2004 | Burrows | |
| 2005/0055355 A1 | 3/2005 | Murthy et al. | |
| 2005/0228792 A1 | 10/2005 | Chandrasekaran et al. | |
| 2006/0010426 A1 | 1/2006 | Lewis et al. | |
| 2006/0028488 A1 | 2/2006 | Gabay et al. | |
| 2006/0031811 A1 | 2/2006 | Ernst et al. | |
| 2006/0235730 A1 | 10/2006 | Politano et al. | |
| 2006/0235731 A1 | 10/2006 | Gupta et al. | |
| 2006/0235737 A1 | 10/2006 | Fleurant et al. | |
| 2006/0271556 A1 | 11/2006 | Mukherjee et al. | |
| 2008/0059080 A1 | 3/2008 | Greiner et al. | |
| 2008/0082345 A1 | 4/2008 | Greiner et al. | |
| 2009/0198779 A1 | 8/2009 | Agrawal et al. | |
| 2010/0023502 A1 | 1/2010 | Marlow | |
| 2010/0042602 A1 | 2/2010 | Smyros et al. | |
| 2010/0082652 A1 | 4/2010 | Jones et al. | |
| 2010/0281061 A1 | 11/2010 | Chen | |
| 2011/0066602 A1 | 3/2011 | Studer et al. | |
| 2011/0119249 A1 | 5/2011 | Flatz et al. | |
| 2011/0137888 A1 * | 6/2011 | Yoo et al. | 707/713 |
| 2011/0153575 A1 | 6/2011 | Glasser et al. | |
| 2011/0225167 A1 | 9/2011 | Bhattacharjee et al. | |
| 2011/0238654 A1 * | 9/2011 | Allen et al. | 707/718 |
| 2011/0246498 A1 | 10/2011 | Forster | |
| 2011/0295815 A1 | 12/2011 | Mandagere et al. | |
| 2012/0117105 A1 * | 5/2012 | Thomas et al. | 707/769 |
| 2012/0150820 A1 | 6/2012 | Sankaranarayanan et al. | |
| 2012/0197928 A1 * | 8/2012 | Zhang et al. | 707/769 |
| 2012/0330954 A1 * | 12/2012 | Sivasubramanian et al. | 707/737 |
| 2013/0018867 A1 * | 1/2013 | Regan et al. | 707/707 |
| 2013/0097599 A1 * | 4/2013 | Konik et al. | 718/1 |
| 2013/0097608 A1 | 4/2013 | Kessler et al. | |
| 2013/0282765 A1 | 10/2013 | Bhattacharjee et al. | |

OTHER PUBLICATIONS

Decipherinfosys, Column Order in a Composite Index, Systems Engineering and RDBMS, May 13, 2008, 4 pgs.

Quassnoi, Explain Extended, Descending Indexes, Apr. 27, 2009, 8 pgs.

Scharlock, Designing Composite Indexes, Sep. 26, 2008, 5 pgs.

PostgreSQL, PostgreSQL 8.1.3 Documentation, Internet Archive Wayback Machine, May 4, 2006, 1 page.

Rush, Maximizing Detection of Data Inconsistency: The Development of a Consistency Check Interpreter, 1987, pp. 848-851Rush, Maximizing Detection of Data Inconsistency: The Development of a Consistency Check Interpreter, 1987, pp. 848-851.

* cited by examiner

Entity Database
140

| | Keys 502 | Properties 504 | Content 506 |
|---|---|---|---|
| Entity 0 | 0 | A=20, B=0, C=0 | Entity 0 Content |
| Entity 1 | 1 | A=1, B=0, C=0 | Entity 1 Content |
| Entity 2 | 2 | A=0, B=0, C=10 | Entity 2 Content |
| Entity 3 | 3 | A=1, B=0, C=50 | Entity 3 Content |
| Entity 4 | 4 | A=0, B=1, C=0 | Entity 4 Content |
| ⋮ | ⋮ | ⋮ | ⋮ |
| Entity 12 | 12 | A=39, B=0, C=0 | Entity 12 Content |
| Entity 13 | 13 | A=7, B=8, C=90 | Entity 13 Content |
| ⋮ | ⋮ | ⋮ | ⋮ |
| Entity 29 | 29 | A=18, B=50, C=56 | Entity 29 Content |
| Entity 30 | 30 | A=0, B=0, C=0 | Entity 30 Content |
| Entity 31 | 31 | A=78, B=15, C=22 | Entity 31 Content |

Figure 5A

RESOURCE CONSTRAINTS FOR REQUEST PROCESSING

RELATED APPLICATIONS

This application claims priority to U.S. Provisional Application Ser. No. 61/565,425, filed Nov. 30, 2011, entitled "Resource Constraints for Request Processing," which is incorporated by reference herein in its entirety.

This application is related to U.S. application Ser. No. 13/431,922, filed Mar. 27, 2012, entitled "Application of Resource Limits to Request Processing," which is incorporated by reference herein in its entirety.

FIELD OF THE INVENTION

The present invention relates generally to the field of distributed client-server computer network systems, and in particular, to a system and method for processing requests according to resource constraints.

BACKGROUND OF THE INVENTION

Executing queries or requests sent to data servers from client devices and/or application servers (or applications) can often be computationally intensive and time-consuming. Moreover, when multiple clients and/or applications send queries or requests to a data server, the data server will typically allocate resources to responding to the multiple requests.

SUMMARY

Data servers frequently receive multiple queries or requests from various applications or client devices concurrently or in rapid succession. When a sufficiently large number of queries are received within a short period of time, the data sever will be unable to fully process all of the requests without introducing substantial delays to at least some of the requests. These delays may occur at unpredictable times and have unpredictable durations, which can have substantial negative impacts for applications that are subject to the delays. The embodiments described herein include systems and methods for reducing or eliminating these problems with conventional approaches to allocating resources when responding to requests.

In some embodiments, in order to more fairly allocate computational resources to different requests, a data server imposes a predefined set of resource constraints on the processing of at least some of the received requests. For a request that is subject to resource constraints, if the request is not completely processed within the imposed set of constraints, the data server terminates the processing of the incomplete request and returns partial (if any) results obtained up to that point to the requesting application or client device. In some situations these partial results will be sufficient for the requesting device. However, in many situations, the partial results will not be sufficient and the requesting client or application will need additional results. Thus the client or application may request resumption of request-processing. In many situations, it is more efficient to resume processing the request at the stage it was terminated rather than repeating the entire request. To enable resumption of request-processing the data server generates status information that can be used to resume processing of the request. By employing this scheme, the data server avoids spending an undue amount of its resources on any one application or client request at the expense of other applications or devices awaiting its resources while providing robust support for resumption of processing requests that were previously terminated, thereby reducing inefficiencies that may result from terminating requests prior to completing processing of the requests.

In some situations a requesting client or application will, depending on the circumstances, either request resumption of processing a request shortly (e.g., within one second) after receiving the partial results or a long time (e.g., more than ten seconds and, optionally days or more) after receiving the partial results. Thus, in some implementations it is advantageous to save both detailed state information and approximate state information for a particular request, where the detailed state information enables the request to be resumed very accurately but is costly to store and the approximate state information enables the request to be resumed less accurately than the detailed state information but is much less costly to store. By storing two types of state information about requests whose processing are terminated prior to completion, the data server has the ability to resume processing requests at low cost if the requests are resumed quickly, while avoiding long term storage of costly detailed state information, and maintaining the ability to resume processing requests (at a slightly higher cost) if the requests are resumed at a later point in time (e.g., after more than a predefined delay).

Obtaining partial results and providing the option of efficiently requesting resumption of request-processing are also beneficial to the requesting device or application. This is particularly useful for applications that make resource-heavy requests to the data server, but are unable to afford the server processing time or the memory resources associated with a complete set of results owing to their own set of constraints. In some situations, obtaining a result that is larger (e.g., occupies more memory storage) than an application instance has the capability to manage or handle, will cause the application instance to be terminated prematurely, which generally is much more inconvenient for a user than receiving partial results, as data may be lost in the premature termination.

In some embodiments, a method is performed at a server system having one or more processors and memory storing one or more programs for execution by the one or more processors so as to perform the method. The method includes receiving a first request from an application and processing at least a portion of the first request in accordance with a predefined set of resource constraints. The method further includes, in accordance with a determination that the predefined set of resource constraints has been met prior to completing processing the first request: terminating processing of the first request prior to completing processing of the first request, generating a first intermediate result, and providing a response to the application. The response includes the first intermediate result and request status information enabling the application to request resumption of the first request.

In some embodiments, a method is performed at a server system having one or more processors and memory storing one or more programs for execution by the one or more processors so as to perform the method. The method includes launching an instance of an application subject to a first set of resource constraints and transmitting a first request from the instance of the application to a datastore server system. Exceeding the first set of resource constraints would cause the application instance to be terminated. The first request is subject to a second set of resource constraints that are more restrictive than the first set of resource constraints. The method further includes receiving a first response to the first request. When processing the first request exceeds the second set of resource constraints, the first response includes a first set of partial results and information enabling the application instance to request resumption of processing the first request, and when the first request was processed without exceeding the second set of resource constraints, the first response includes complete results.

In accordance with some embodiments, a computer system (e.g., a client system or server system) includes one or more processors, memory, and one or more programs; the one or more programs are stored in the memory and configured to be executed by the one or more processors and the one or more programs include instructions for performing the operations of one of the methods described above. In accordance with some embodiments, a non-transitory computer readable storage medium has stored therein instructions which when executed by one or more processors, cause a computer system (e.g., a client system or server system) to perform the operations of one of the methods described above.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

FIG. 5A is a block diagram illustrating an entity database including information about entities stored in a datastore server system, in accordance with some embodiments.

DESCRIPTION OF EMBODIMENTS

It will be understood that, although the terms "first," "second," etc. may be used herein to describe various elements, these elements should not be limited by these terms. These terms are only used to distinguish one element from another. For example, a first request could be termed a second request, and, similarly, a second request could be termed a first request, without changing the meaning of the description, so long as all occurrences of the "first request" are renamed consistently and all occurrences of the second request are renamed consistently. The first request and the second request are both requests, but they are not the same request.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The embodiments described below include client, application server and datastore server systems, which typically inter-operate in a distributed client-server system and corresponding methods of processing requests that are subject to resource constraints.

Figure 1:
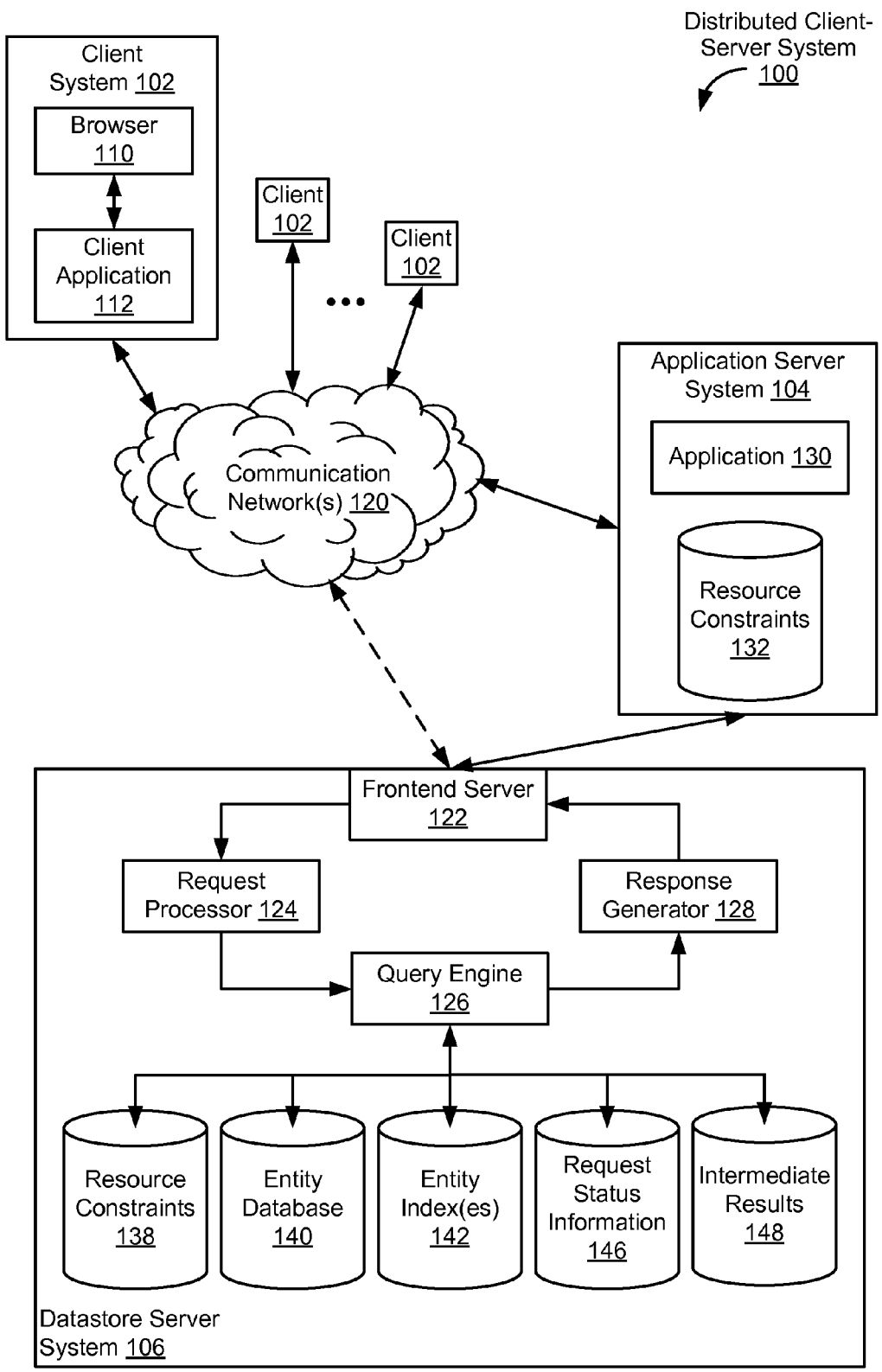
FIG. 1 is a block diagram illustrating a distributed client-server system, in accordance with some embodiments.

FIG. 1 includes a block diagram illustrating an example of a Distributed Client-Server System 100 for processing requests that are subject to resource constraints. System 100 includes one or more Client System(s) 102 (also referred to herein as "Client 102"), an Application Server System 104 (also referred to herein as "App Server 104"), a Datastore Server System 106 (also referred to herein as "Datastore Server 106") and a Communication Network 120 for connecting Clients 102, App Server 104 and Datastore Server 106 to each other. Communication Network 120 optionally includes the Internet, one or more local area networks (LANs), one or more wide area networks (WANs), other types of networks, or a combination of such networks.

Client 102 optionally includes Browser 110 and Client Application 112. Browser 110 can be a general purpose Internet browser (sometimes called a Web browser) having a browser window used for displaying an application interface. A web application for submitting a data request is optionally implemented using hypertext markup language (HTML) or extensible markup language (XML) elements that are rendered by Browser 110. Alternatively, a data request is, optionally, submitted via a standalone Client Application 112. After a user submits a data request through Browser 110 or a standalone Client Application 112, Client 102 relays the request to Datastore Server 106, directly or through App Server 104, via Communication Network 120. Datastore Server 106 processes the data request and transfers results and, optionally, a set of display information back to Client 102, directly or through App Server 104. Client Application 112 and/or Browser 110 use(s) the results and display information to render an updated application state at Client 102.

In some embodiments, App Server 104 includes Application 130 and Resource Constraints 132. In some implementations, Application 130 is a backend application for receiving and responding to requests from an application (e.g., Client Application 112) at Client 102. Application 130 (or an instance thereof) is subject to Resource Constraints 132 that are enforced on App Server 104. In some implementations, Application 130 transmits data requests to Datastore Server 106 (e.g., to request data for use in responding to a request from an application at Client 102). It should be understood that in some embodiments, requests from Client 102 are transmitted to Datastore Server 106 without an intermediary backend application, while in other embodiments requests from Client 102 are transmitted to Application 130 on App Server 104 and Application 130 communicates with Datastore Server 106. Additionally, in some implementations it is advantageous to handle some client requests without an intermediary backend application at App Server 104, while other client requests are handled by an intermediary backend application (e.g., Application 130).

In some embodiments, Datastore Server 106 includes Frontend Server 122, Request Processor 124, Query Engine 126, Response Generator 128, Resource Constraints 138, Entity Database 140, one or more Index(es) 142, Request Status Information 146 and, optionally, Intermediate Results 148. Query Engine 126 processes information about the entities that are stored in Entity Database 140 to produce Index(es) 142 for use by Query Engine 126 when performing a search query. Alternatively or in addition, Query Engine 126 retrieves information about entities from a remote source such as a remote database or web crawler that systematically retrieves information from a plurality of remote sources (e.g., websites). These operations are typically performed by Query Engine 126 prior to receiving the request at Datastore Server 106. In addition, Query Engine 126 typically continues to update Index(es) 142 in between requests or queries.

Frontend Server 122 relays requests from Clients 102 or App Server 104 to Request Processor 124, which optionally processes a request by selecting an order in which to apply filters and sort orders specified in the request and transmits the processed request to Query Engine 126. The Request Processor 124 processes the request so as to improve the performance characteristics of the request (e.g., by dividing the request into subrequests, and determining an order to perform subrequests that reduces the time to perform the request and/or reduces the maximum or total processor usage). Query Engine 126 identifies, in Index(es) 142, indexes and/or index portions adapted for responding to the request and performs the request (or a portion thereof) on the identified indexes and/or index portions to generate a response in accordance with the Resource Constrains 138. For example, Resource Constraints 138 are used by Query Engine 126, while processing a respective request, in order to determine whether a predefined request processing limit has been reached (e.g., a resource usage limit or a limit based on a number of retrieved results, a size of the retrieved results and/or a number of index entries examined).

In circumstances where a request has been terminated prior to completion, Request Status Information 146 is stored at Datastore Server 106 and corresponds to the state of a request from App Server 104 or Client 102 at the time it was terminated, thus enabling App Server 104 or Client 102 to request resumption of the previously terminated request. In some embodiments, Request Status Information 146 includes detailed status information and/or approximate status information. In some implementations, Query Engine 126 uses Request Status Information 146 to resume processing of the request. In some embodiments, Request Status Information 146 expires in accordance with predefined criteria such as any of the following: passage of a predefined amount of time, expiration (or termination) of an instance of the application from which the first request was received, a notification from the application that the first intermediate result was sufficient, and a determination that no more results are present.

In some embodiments, when a request is terminated prior to completion, Intermediate Results 148 are stored at Datastore Server 106 by Query Engine 126. Similarly, in some embodiments, when a request is terminated after completing the request, the complete results (or a portion thereof) are at least temporarily stored at Datastore Server 106 until they are sent to Client 102 or App Server 104.

In some embodiments, Response Generator 128 generates a response based Intermediate Results 148 and Request Status Information 146. For example, when a respective request has been terminated after exceeding Resource Constraints 138, Response Generator 128 generates a response to the respective request that includes Intermediate Results 148 associated with the request and a representation of Request Status Information 146 associated with the request (e.g., information enabling Datastore Server 106 to resume processing the respective request at some point in the future). Response Generator 128 also, optionally, determines display information for the response. The response and, optionally, display information is passed to Frontend Server 122, which in turn passes the results to Client 102 via Communication Network 120 or to App Server 104 for display at Client 102 (e.g., via Browser 110 or Client Application 112).

Figure 2:
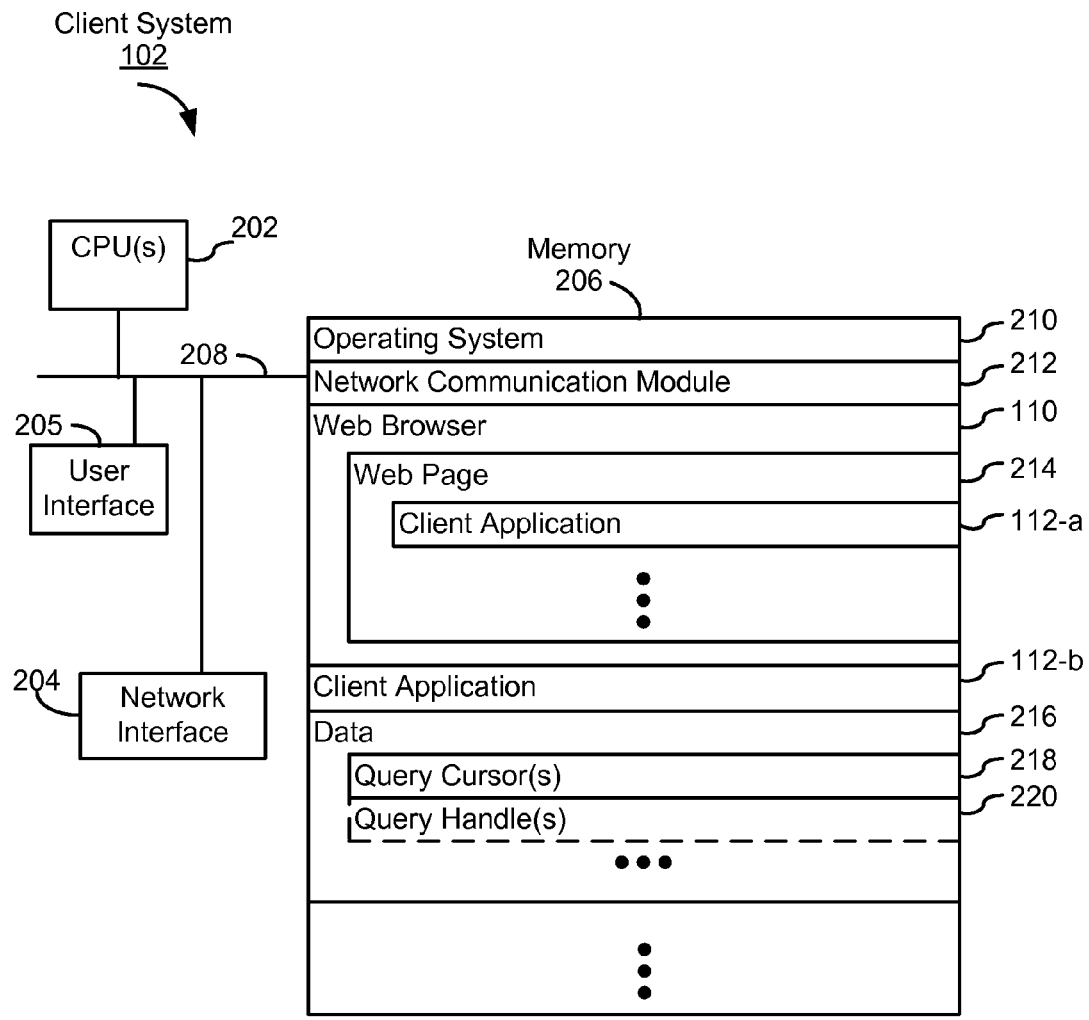
FIG. 2 is a block diagram illustrating a client system, in accordance with some embodiments.

FIG. 2 is a block diagram illustrating a Client System 102 (also referred to herein as a "Client 102") in accordance with some embodiments. Client 102 typically includes one or more processing units 202 (sometimes called CPU(s)), one or more network or other Communication Interfaces 204, Memory 206, a User Interface 205 comprising a display device and one or more input devices (e.g., a keyboard, mouse, touchpad, touchscreen or other input device), and one or more Communication Buses 208 for interconnecting these components. Communication Buses 208 optionally include circuitry (sometimes called a chipset) that interconnects and controls communications between system components. Memory 206 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 206 optionally includes one or more storage devices remotely located from the CPU(s) 202. Memory 206, or alternatively the non-volatile memory device(s) within Memory 206, comprises a non-transitory computer readable storage medium. In some embodiments, Memory 206 or alternatively the non-transitory computer readable storage medium stores the following programs, modules and data structures, or a subset thereof:

- Operating System 210 that includes procedures for handling various basic system services and for performing hardware dependent tasks;
- Network Communication Module (or instructions) 212 that is used for connecting Client System 102 to other computers (e.g., App Server 104 or Datastore Server 106) via one or more Network Interfaces 204 (wired or wireless) and one or more Communication Networks 120 (FIG. 1), such as the Internet, other wide area networks, local area networks, metropolitan area networks, and so on;
- Web Browser 110 for loading web pages such as a Web Page 214, which optionally includes code for executing a Client Application 112-*a* as an embedded application in Web Page 214, where Client Application 112-*a* sends requests to Datastore Server 106 or to App Server 104 and displays data received from Datastore Server 106 or from App Server 104;

dedicated Client Application 112-*b* (e.g., a stand-alone email client) for sending requests to Datastore Server 106 or to App Server 104 and displaying data received from Datastore Server 106 or from App Server 104; and Data 216, such as cached data (e.g., recently accessed entities, responses to prior requests, recent results etc.), and/or, optionally, information associated with request status information such as one or more Query Cursor(s) 218 or Query Handle(s) 220 received from Datastore Server 106 or App Server 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 206 optionally stores a subset of the modules and data structures identified above. Furthermore, in some implementations Memory 206 stores additional modules and data structures not described above.

Figure 3:
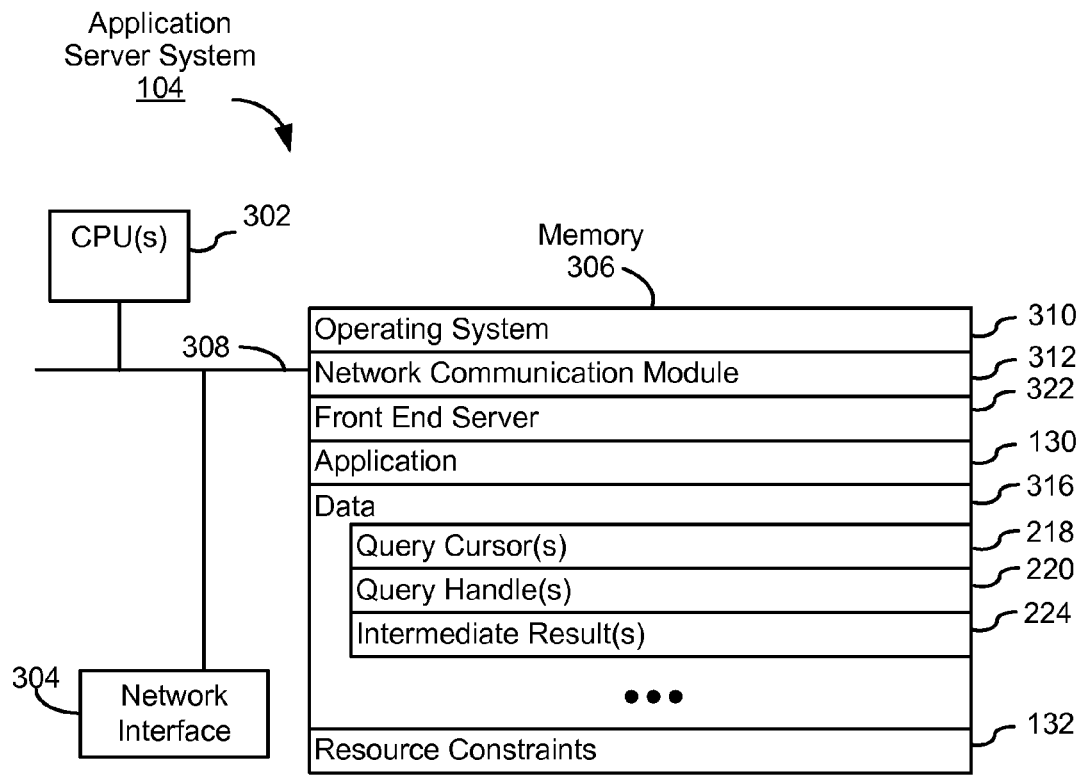
FIG. 3 is a block diagram illustrating an application server system, in accordance with some embodiments.

FIG. 3 is a block diagram illustrating an Application Server System 104 (also referred to herein as an "App Server 104") in accordance with some embodiments. App Server 104 typically includes one or more processing units CPU(s) 302, one or more network or other Communications Interfaces 304, Memory 306, and one or more Communication Buses 308 for interconnecting these components. Communication Buses 308 optionally include circuitry (sometimes called a chipset) that interconnects and controls communications between system components. Memory 306 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 306 optionally includes one or more storage devices remotely located from the CPU(s) 302. Memory 306, or alternatively the non-volatile memory device(s) within Memory 306, comprises a non-transitory computer readable storage medium. In some embodiments, Memory 306 or alternatively the non-transitory computer readable storage medium stores the following programs, modules and data structures, or a subset thereof:

Operating System 310 that includes procedures for handling various basic system services and for performing hardware dependent tasks;

Network Communication Module (or instructions) 312 that is used for connecting App Server 104 to other computers (e.g., Client 102 and Datastore Server 106) via one or more Network Interfaces 304 (wired or wireless), and one or more Communication Networks 120 (FIG. 1), such as the Internet, other wide area networks, local area networks, metropolitan area networks, and so on;

Frontend Server 322 for coordinating communication between App Server 104, Clients 102, Datastore Server 106 and any other computer systems with which App Server 104 communicates;

Application 130 for processing requests from Clients 102 and relaying the requests to Datastore Server 106 corresponding to the client-specified requests;

Data 316 including one or more of Query Cursor(s) 218, Query Handle(s) 220 and Intermediate Result(s) 224 received from Datastore Server 106; and Resource Constraints 132 (e.g., a resource usage limit or a limit based on a number of retrieved results and/or a size of the retrieved results) imposed on an instance of Application 130 by Operating System 310 or another supervisory process at App Server 104 such that exceeding Resource Constraints 132 will cause the instance of Application 130 to be terminated.

In some embodiments, Application 130 is a backend of Client Application 112 at Client 102. Thus, in some of these embodiments Client 102 interacts primarily with Application 130, and Application 130 makes specific data requests to Datastore Server 106 that enable Datastore Server 106 to respond to the client-specified requests from Client 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 306 optionally stores a subset of the modules and data structures identified above. Furthermore, Memory 306 optionally stores additional modules and data structures not described above.

Although FIG. 3 shows an "Application Server System" 104, FIG. 3 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement an Application Server System 104 and how features are allocated among them will vary from one implementation to another, and optionally depends in part on the amount of data traffic that the system must handle during peak usage periods as well as during average usage periods.

Figure 4:
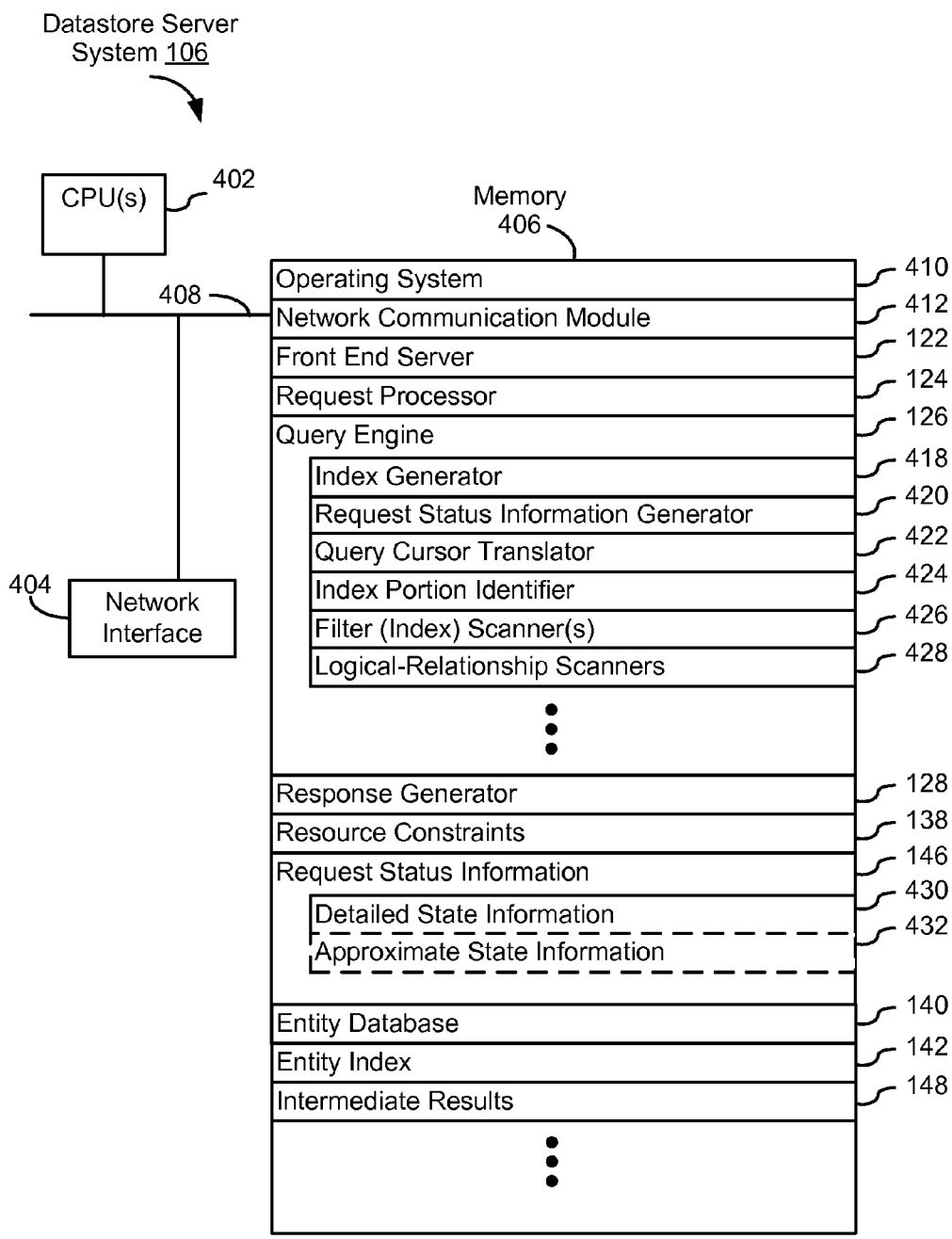
FIG. 4 is a block diagram illustrating a datastore server system, in accordance with some embodiments.

FIG. 4 is a block diagram illustrating a Datastore Server System 106 (also referred to herein as a "Datastore Server 106") in accordance with some embodiments. Datastore Server 106 typically includes one or more processing units CPU(s) 402, one or more network or other Communications Interfaces 404, Memory 406, and one or more Communication Buses 408 for interconnecting these components. Communication Buses 408 optionally include circuitry (sometimes called a chipset) that interconnects and controls communications between system components. Memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 406 optionally includes one or more storage devices remotely located from the CPU(s) 402. Memory 406, or alternatively the non-volatile memory device(s) within Memory 406, comprises a non-transitory computer readable storage medium. In some embodiments, Memory 406 or alternatively the non-transitory computer readable storage medium stores the following programs, modules and data structures, or a subset thereof:

Operating System 410 that includes procedures for handling various basic system services and for performing hardware dependent tasks;

Network Communication Module (or instructions) 412 that is used for connecting Datastore Server 106 to other computers (e.g., Client 102 or App Server 104) via one or more Network Interfaces 404 (wired or wireless), and one or more Communication Networks 120 (FIG. 1), such as the Internet, other wide area networks, local area networks, metropolitan area networks, and so on;

Frontend Server 122 for coordinating communication between Datastore Server 106, App Server 104, Clients 102 and any other computer systems with which Datastore Server 106 communicates;

Request Processor 124 for converting a request received from Client 102 or App Server 104 into a request to be processed by Query Engine 126, for multi-step requests; the converting optionally includes revising the order and/or composition of the steps so as to improve the speed and/or efficiency of performing the request;

Query Engine 126 for processing the request received from Client 102 or App Server 104 in accordance with Resource Constraints 138, terminating requests in accordance with Resource Constraints 138, and generating and optionally storing Request Status Information 146 for terminated requests, in some embodiments Query Engine 126 includes one or more of the following modules or components:

- Index Generator 418 for generating indexes (e.g., Entity Index 142) for use in processing requests. In some implementations, the indexes are generated by sorting index entries such that index entries sharing a common component value have consecutive positions in the index. In some implementations, Index Generator 418 generates a large number of indexes (e.g., at least one index or index portion for each property that can be used to sort and/or filter responses) so that for each possible combination of filters and sort orders in a request, there exists an index including an index portion where the index entries matching the combination of filters are arranged in a contiguous block of index entries sorted in the sort order. In some implementations, Index Generator 418 updates Index(es) 142 in accordance with updates to Entity Database 140.

- Request Status Information Generator 420 for generating Request Status Information 146 enabling Datastore Server 106 to resume processing the request if the request is terminated before completion of the request. In some implementations the request status information includes one or more query cursors that are representative of Approximate State Information 432.

- Query Cursor Translator 422 for receiving, along with a new request, a query cursor generated in response to a prior request, decomposing the query cursor and determining a corresponding new query cursor that indicates a location in index portions associated with the new request corresponding to a stopping point in the index portions associated with the prior request.

- Index Portion Identifier 424 for identifying index portions that are adapted for responding to a request (e.g., when the request includes a search query, index portions that match all of the filters of a search query and are sorted in same sort order, such as a sort order specified by the search query).

- One or more Filter (Index) Scanners 426 for scanning through an index or index portion to retrieve one or more identifiers (e.g., Keys) of one or more next matching results (e.g., matching index entries that are sequentially adjacent to the last matching index entry or query cursor position in the sort order) in the index or index portion.

- One or more Logical-Relationship Scanners 428 for retrieving identifiers of matching entities from the index portions identified by Index Portion Identifier 424 in accordance with the received search query. The Logical-Relationship Scanners 428 optionally include one or more of an AND_Scanner, a NOT_Scanner, and an OR_Scanner.

Response Generator 128 for generating a response in accordance with the information processed by Query Engine 126 (e.g., intermediate results for the request and request status information enabling processing of the request to be efficiently resumed), and generating display information to be transmitted to Client 102 or App Server 104, where the display information specifies formatting of the responses at Client 102 or App Server 104;

Resource Constraints 138 (e.g., resource usage limits and/or limits based on a number of retrieved results, a size of the retrieved results and/or a number of index entries examined) for use by Query Engine 126 to determine when to terminate processing a request prior to completion of processing the request;

Request Status Information 146 for enabling Query Engine 126 to resume processing of a request that was previously terminated prior to completion of the request; in some implementations, at least a portion of Request Status Information 146 is temporarily stored (e.g., the temporarily stored Request Status Information expires in accordance with predefined criteria such as a predefined amount of time, expiration or termination of an instance of the application from which the first request was received, a notification from the application that the first intermediate result was sufficient, and/or a determination that no more results are present); in some embodiments the Request Status Information 146 includes one or more of:

- Detailed State Information 430 which includes detailed information corresponding to a saved state of a query terminated prior to completion; in some embodiments, Detailed State Information 430 includes a query handle, current minimum key, number of index(es) that match the current minimum key and/or a next index or index portion to check; in some implementations Detailed State Information 430 is costly to store for a large number of requests and thus is stored temporarily and deleted when predetermined conditions are met; and

- Approximate State Information 432 which includes approximate information about a saved state of a query terminated prior to completion, in some embodiments, Approximate State Information 432 includes a query cursor which includes a key for an entity corresponding to the last processed entity that matches the request, in some embodiments, the query cursor is sent along with results to serve as a "bookmark" that can be returned to Datastore Server 106 with a subsequent request to enable Datastore Server 106 to resume processing the request if corresponding Detailed State Information 430 has already been deleted;

Entity Database 140 for storing entities or information about entities;

one or more Index(es) 142 which store information about entities and properties of the entities; typically the Index(es) 142 are each sorted in accordance with values of the components (e.g., kinds, properties) for the entities, as described in greater detail below with reference to FIGS. 5A-5B; and Intermediate Result(s) 148 corresponding to results that were generated in response to a request that was terminated prior to completion in accordance with Resource Constraints 138.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, Memory 406 optionally stores a subset of the modules and data structures identified above. Furthermore, Memory 406 optionally stores additional modules and data structures not described above.

Although FIG. 4 shows a "Datastore Server System" 106, FIG. 4 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers used to implement a Datastore Server System 106 and how features are allocated among them will vary from one implementation to another, and optionally depends in part on the amount of data traffic that the system must handle during peak usage periods as well as during average usage periods.

Entities, Indexes and Request Status Information

FIG. 5A illustrates an entity database including information about entities stored in a datastore server system, in accordance with some embodiments. Entity Database 140 shown in FIG. 5A stores information about entities (data objects) having Keys 502 (unique identifiers), and component types such as Properties 504 and Content 506. In some embodiments, an entity has a set of metadata including one or more properties, each property having one or more possible values. Possible values of properties can include either specific valid values (e.g., "True" or "False") of specific types of values that are valid (e.g., integers, floating point values, strings, dates, or binary data). In other embodiments there are properties that are not associated with any particular kind or are associated with multiple kinds. As one example, in some circumstances, both a person and a business have a "name" property that can be any string of characters.

In the example shown in FIG. 5A, Entity Database 140 has entities organized in rows; each entity having a corresponding Key. In this example, Entity Database 140 is sorted by Keys 502. The entities shown in FIG. 5A have values for a plurality of Properties 504 including properties A, B, and C. For example, Entity 0 has Key=0 and Properties A=20, B=0, and C=0. Similarly, Entity 31 has Key=31 and Properties A=78, B=15, and C=22 respectively. In some embodiments, one or more of the entities in Entity Database 140 have corresponding Content 506. However, in other embodiments, one or more of the entities do not have content distinct from Properties 504 and/or have at least one property that includes an identifier for content stored in another location (e.g., a property Content=ContentID, where ContentID identifies or corresponds to a storage location of the content).

In some implementations, a property can have multiple values. For example, for entity 1, property A could have values of 5, 7 and 9. A property with multiple values can have values of mixed types (e.g., for a particular entity, a property could have one value that is an integer and another value that is a string). It should be understood that the metadata described above (e.g., properties and values) can be used either as predefined sort parameters or to determine whether respective entities meet filter criteria based on the metadata when searching for entities in Entity Database 140.

In some embodiments, each entity has a key that uniquely identifies the entity, also called a "unique identifier" for the entity. In some implementations, a key is simply an Entity ID that is associated with the entity (e.g., assigned by Datastore Server 106). In other implementations, the key includes a kind and the Entity ID. The kind categorizes the entity so that it can more easily be identified and retrieved. Additionally, in some embodiments, a key uniquely identifies an entity for a particular application (e.g., Application 130 in FIG. 3). Thus, in some implementations an application identifier (e.g., an identifier of Application 130 in FIG. 3) and, optionally, a namespace identifier (e.g., an identifier of a namespace or other logical division of data for Application 130 in FIG. 3) are embedded in the key, or are used in addition to the key, to uniquely identify an entity in Entity Database 140.

In some embodiments, an entity is requested by Client 102 or App Server 104 either by submitting a request for an entity associated with a particular key, or by requesting performance of a search query that matches the entity's component type (e.g., Property). For example, in the case of Entity Database 140 shown in FIG. 5A, a search request for all entities with Property A=1 will result in Entity 1, and Entity 3 from among the entities listed in Entity Database 140 in FIG. 5A and optionally other entities with Property A=1 not shown in FIG. 5A). A request performed using a search query that matches the entity's properties will typically first produce the key for the matching entity using Index(es) 142 (as described below with respect to FIG. 5B) and then retrieve the entity or information representative of the entity from Entity Database 140.

Figure 5B:
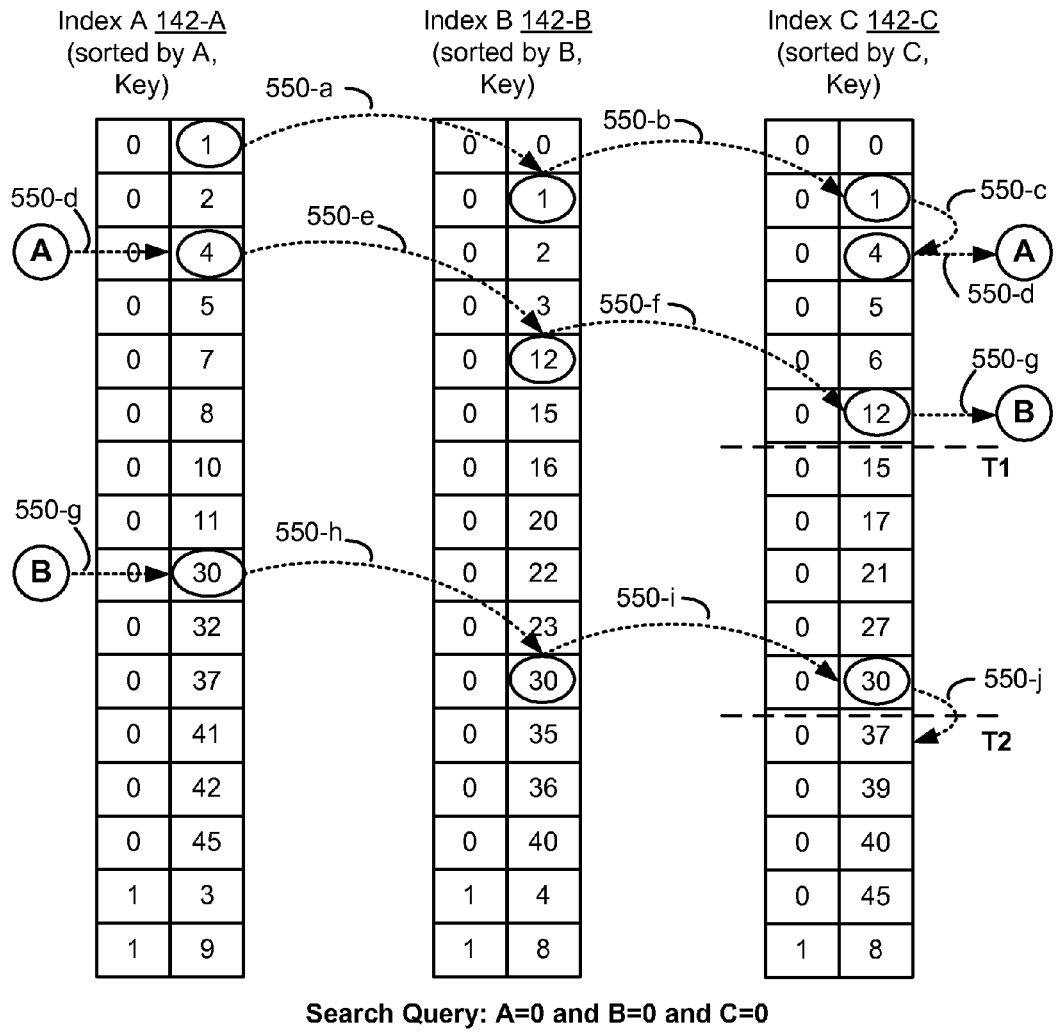
FIG. 5B is a block diagram illustrating indexes including index entries for entities stored in an entity database, and state information generated while processing a request using the indexes, in accordance with some embodiments.

FIG. 5B illustrates exemplary Indexes 142 for different properties for a plurality of entities having multiple properties and unique identifiers (keys). The indexes (Index A 142-A, Index B 142-B and Index-C 142-C) illustrated in FIG. 5B each have a respective plurality of index entries (rows) sorted in accordance with values of a property and a key (columns). In some implementations, there is an index entry for each value of a property of an entity. Thus, if there is a multi-valued property, there will be at least two index entries for the entity (e.g., two index entries in the same index with the same key but different filter values), one sorted in accordance with the first value of the property and another sorted in accordance with the second value of the property. Additionally, in some embodiments, Index A 142-A, Index B 142-B and Index C 142-C are portions of a single index that includes a portion for entities sorted by values of property A, a portion for entities sorted by values of property B and a portion for entities sorted by values of property C.

Each of the exemplary indexes in FIG. 5B is adapted for responding to queries including a filter for the respective property included in the index (e.g., A, B, or C for Index A 142-A, Index B 142-B or Index C 142-C, respectively). The indexes include portions that are indicated by the values of the property. For example, Index A 142-A has at least two portions, a portion where A=0 and a portion where A=1, and these portions are internally contiguous portions (e.g., a contiguous set of index entries where A=0 and a contiguous set of index entries where A=1) because Index A 142-A is sorted monotonically in accordance with the values of property A. Similarly, Index B 142-B also has at least two portions, a portion where B=0 and a portion where B=1, and these portions are internally contiguous portions (e.g., a contiguous set of index entries where B=0 and a contiguous set of index entries where B=1) because Index B 142-B is sorted monotonically in accordance with the values of property B. Index C 142-C is sorted in a similar manner, and also has at least two different portions corresponding to two different values for property C, the portions for Index C 142-C include: a portion where C=0, and a portion where C=1, and these portions are internally contiguous portions because Index C 142-C is sorted monotonically in accordance with the values of property C. Also, it should be understood that each of the index portions are internally sorted in a default sort order (e.g., the index entries within a portion are sorted by key, which is not typically a user selected sort order, as the values of the keys are not usually known by the user and frequently do not correspond to any property that is relevant to the user).

When a search query is received, indexes are selected to perform the search query based on the properties that are included in the index. Moreover, in some implementations, when processing a search query specifying a filter, Datastore Server 106 (or Query Engine 126 of Datastore Server 106) only needs to look for index entries matching the search query in the portion of the index matching the filter, because the index is sorted so that index entries in all other sections of the index do not match the filter and thus are irrelevant to the search query. For example, for a search query including the filter A=0, results (e.g., identifiers of index entries) will only be retrieved from the portion of Index A that corresponds to A=0, and the portion of Index A where A=1 will be ignored. Thus, in some embodiments, for each property for which a search query can be performed, there is an index that is sorted in accordance with values of that property.

In some implementations, Datastore Server 106 provides request processing services for a plurality of different applications (e.g., Application 130 in FIG. 3, Application 112 in FIG. 2, and/or other applications), and each application has its own set of indexes for performing search queries in response to requests (e.g., requests to perform a search query or requests that are processed using a search query). In these implementations each application defines its indexes in a configuration file. As the entities in Entity Database 140 are updated, Datastore Server 106 (or Query Engine 126) updates the indexes (e.g., by updating the values for properties for the entities when the entities are modified). When a user requests that the application execute a search query, the search query is passed to Datastore Server 106, which generates search results using indexes corresponding to the search query.

In some embodiments, Index 142 is too large to be stored on a single storage device (e.g., database servers, hard drives, flash drives etc.) and thus is distributed across multiple different storage devices.

In some circumstances, multiple index portions will be used to respond to a single search query (e.g., when a search query such as A=1 AND B=1 or A=0 AND B=1 is performed, both Index A 142-A and Index B 142-B are used to respond). When multiple indexes are used, it is important for many of the embodiments described herein that the index portions used to perform the search query are all sorted in a same sort order. For example, in FIG. 5B, all of the index portions are sorted by primary key in ascending order.

The example shown in FIG. 5B illustrates execution of an exemplary search query "A=0 AND B=0 AND C=0." As explained above, for this query to be performed, three indexes (or portions thereof) are used (e.g., Index A 142-A, Index B 142-B, and Index C 142-C). For execution of this query, Datastore Server 106 starts with the first value in the index portion of Index A 142-A where A=0. In this example, Datastore Server 106 starts at the first index entry in the index portion of Index A 142-A where A=0 which corresponds to Key=1. Using the Key obtained from the index portion of Index A 142-A where A=0, Datastore Server 106 proceeds (550-*a*) to traverse the portion of Index B 142-B where B=0 to look for an entry with Key≥1. Upon finding an index entry where Key=1 in the portion of Index B 142-B where B=0, Datastore Server 106 sets Key=1 as the current minimum key and proceeds (550-*b*) to Index C 142-C and again traverses the portion of Index C 142-C corresponding to property value C=0 to look for an entry with Key≥1. Upon finding an index entry where Key=1 in the portion of Index B 142-B where B=0, Datastore Server 106 identifies Entity 1 (corresponding to Key=1) as a valid match for search query A=0 AND B=0 AND C=0 and updates request status information indicating that the entity with Key=1 is a match (e.g., because index entries with Key=1 were found in the relevant portions of all of the indexes used to perform the search).

Continuing the example from FIG. 5B, Datastore Server 106 continues the search within the current index portion of Index C 142-C where C=0 and then progresses (550-*c*) to the next entry in the current index portion where Key is greater than 1, in this example and the key for the next index entry is Key=4. While the present example describes continuing to scan within the current index portion, in principle any of the index portions used for the search query could be used as a starting point for the next segment of processing the search query. Using the new minimum key (e.g., Key=4), Datastore Server 106 proceeds (550-*d*) to search the portion of Index A 142-A where A=0 to locate an index entry for Key≥4. Upon finding a positive match, Datastore Server 106 proceeds (550-*e*) to Index B 142-B within the portion corresponding to B=0 to find an index entry for Key≥4.

Upon finding no match for Key=4 in the portion of Index B 142-B where B=0, the entity with K=4 is determined not to match the search query (e.g., because the entity with Key=4 does not include a property with B=0). Additionally, the search cursor progresses (550-*e*) to the next entry in the current index portion (e.g., the portion of Index B 142-B where B=0) with Key≥4. In the example shown in FIG. 5B, the next entry in the current index portion is the index entry with Key=12. Using the new minimum key (e.g., Key=12), the Datastore Server 106 proceeds (550-*f*) to search through the portion of Index C 142-C where C=0 to find an index entry for Key≥12. Upon finding this match, Datastore Server 106 proceeds (550-*g*) to the portion of Index A 142-A where A=0 to find an index entry for Key≥12.

Upon finding no match for Key=12 in the portion of Index A 142-A where A=0, Datastore Server 106 progresses (550-*g*) to the next entity in the current index portion (e.g., the portion of Index A 142-A where A=0). In the example shown, this entry in Index A 142-A corresponds to Entity 30 with Key=30. Using the new minimum key (e.g., Key=30), Datastore Server 106 proceeds (550-*h*) to search through the portion of Index B 142-B where B=0 to find an index entry for Key≥30. Upon finding an index entry for Key=30, Datastore Server 106 proceeds (550-*i*) to the portion of Index C 142-C where C=0 to find an index entry for Key=30. Upon finding an index entry where Key=30 in the index portion of Index C 142-C where C=0, Datastore Server 106 identifies Entity 30 (corresponding to Key=30) as a valid match for search query A=0 AND B=0 AND C=0, and updates request status information indicating that the entity with Key=30 is a match (e.g., because index entries with Key=30 were found in the relevant portions of all of the indexes used to perform the search). In some circumstances the request would proceed (550-*j*) in a similar manner until Datastore Server 106 determined that there were no more results to return.

The discussion above illustrates an example where the execution of the search query "A=0 AND B=0 AND C=0" is not terminated, and thus continues until it is complete (which would be when the search query reaches an end of one of the relevant portions of the indexes). However, in some embodiments, as described above, a request (e.g., a search query) is terminated prior to completion. Two examples of the previous search request being terminated at different points prior to completion are described below. In a first example, processing of the request is terminated at point T1 (e.g., just after Datastore Server 106 has identified the index entry where Key=12 in the portion of Index C 142-C where C=0 or just prior to execution of step 550-*g*). In a second example, processing of the request is terminated at point T2 (e.g., just after Datastore Server 106 has identified the index entry where Key=30 in the portion of Index C 142-C where C=0 or just prior to execution of step 550-*j*). In some embodiments, the requests are terminated in accordance with Resource Constraints imposed by Datastore Server 106. Thus, as T1 is different from T2, the resource constraints for these two examples would typically be different and thus result in different termination points.

In the first example, Resource Constraints 138 are met and/or exceeded just prior to execution of step 550-*g* and so Datastore Server 106 terminates processing the request prior to step 550-*g*. In this scenario, the result (Result 1) only contains Entity 1, which is the only matching entity that was found prior to termination of processing the request. Furthermore, Approximate State Information 432-*a* contains a Query Cursor corresponding to the Key for Entity 1, the last match found prior to termination of processing the request. However, Detailed State Information 430-*a* contains more detailed information corresponding to the state of the request at the time it was terminated. Detailed State Information 430-*a* includes a Query Handle that is a unique identifier associated with Detailed State Information 430-*a*, a Current Minimum Key=12 that corresponds to the Key of the last index entry checked, a number of indexes that match the current minimum key (e.g., Index B 142-B and Index C 142-C), and a next index to check=Index A. In this example, the current minimum key (Key=12) is different from the key of the last matched entity (Key=1), because the last key checked did not result in identification of a matching entity.

In the second example, Resource Constraints 138 are met and/or exceeded just prior to execution of step 550-*j* and so Datastore Server 106 terminates processing the request prior to step 550-*j*. In this scenario, the result (Result 2) contains Entity 1 and Entity 30, which are the two matches found prior to termination of processing the request. Furthermore, Approximate State Information 432-*b* contains a Query Cursor corresponding to the Key for Entity 30, the last match found prior to termination of processing the request. As described for Detailed State Information 430-*a* for the first exemplary scenario above, Detailed State Information 430-*b* also contains more detailed information corresponding to the state of the request at the time it was terminated. Detailed State Information 430-*b* includes a Query Handle that is a unique identifier associated with Detailed State Information 430-*b*, a Current Minimum Key=30 that corresponds to the Key of the last index entry checked, a number of indexes that match the current minimum key (e.g., Index A 142-A, Index B 142-B and Index C 142-C), and a next index to check=Index C. In this example, the current minimum key (Key=30) is the same as the key of the last matched entity (Key=30), because the last key checked resulted in identification of a matching entity.

In some implementations, complex queries are executed and the corresponding detailed state information 430 includes a large number of other status parameters that enable Datastore Server 106 to efficiently pick up processing the request where it left off. In some implementations, these additional status parameters include one or more of the following: query planning information indicative of an execution plan for processing the request (e.g., object relationships), cached data related to the request (e.g., data retrieved from a data source but not yet processed), metadata about the underlying data sources (e.g., access times and alternative data sources), identifiers for processes that are pre-fetching results. In some embodiments, some or all of these additional status parameters are shared between different requests. Additionally, in some implementations a request will correspond to a search query with multiple components, and the detailed state information will include a current minimum key for each of the components (e.g., a component using an AND scanner and a component using a NOT scanner). Storing all of this information for a large number of requests would quickly start to consume a large amount of storage resources. Additionally, in some implementations the detailed state information is stored in low-latency memory such as high-speed random access memory for faster access. Low-latency memory (e.g., random access memory) is generally more costly and has less storage space than high latency memory (such as magnetic hard drives and tape storage), making it advantageous to reduce the amount of information stored in this memory by deleting detailed state information. Moreover, at least some of this information quickly becomes outdated, and thus is less valuable after more than a nominal time period (e.g., more than 5 minutes) has passed. As such, in many circumstances, there are minimal advantages to storing the detailed state information for long periods of time (as at least some of it has expired) and there are substantial advantages (e.g., reduced utilization of storage resources) to deleting detailed state information that is stale (e.g., detailed state information that is more than 1 minute old).

As described above, in some embodiments, the detailed state information includes minimum keys corresponding to multiple different indexes and/or index scanners. In contrast, in some implementations, the approximate state information only includes key information corresponding to a last matched entity. Thus, in these implementations, the detailed state information would include keys (e.g., current minimum keys) for multiple indexes and index scanners, while the approximate state information would only include a key for the last matched entity that matched all of the scanners. As such, the approximate state information is much easier to transmit to Client 102 or App Server 104 than detailed state information. Additionally, in some circumstances, transmitting detailed state information to Client 102 or App Server 104 would reveal proprietary and or private information, and thus it is advantageous to avoid sending this information outside of Datastore Server 106. One approach to providing Client 102 and/or App Server 104 with the ability to submit a request to continue processing a prior request using the detailed state information without transmitting the detailed state information to Client 102 and/or App Sever 104 is to provide Client 102 and/or App Server 104 with an identifier (e.g., a query handle) for the detailed state information. If this information is provided along with intermediate results, the Client 102 and/or App Server 104 can request that Datastore Server 106 continue processing a request using detailed state information associated with the identifier without having access to the contents of the detailed state information.

Responding to a Request Based on a Set of Resource Constraints

Figure 6A:
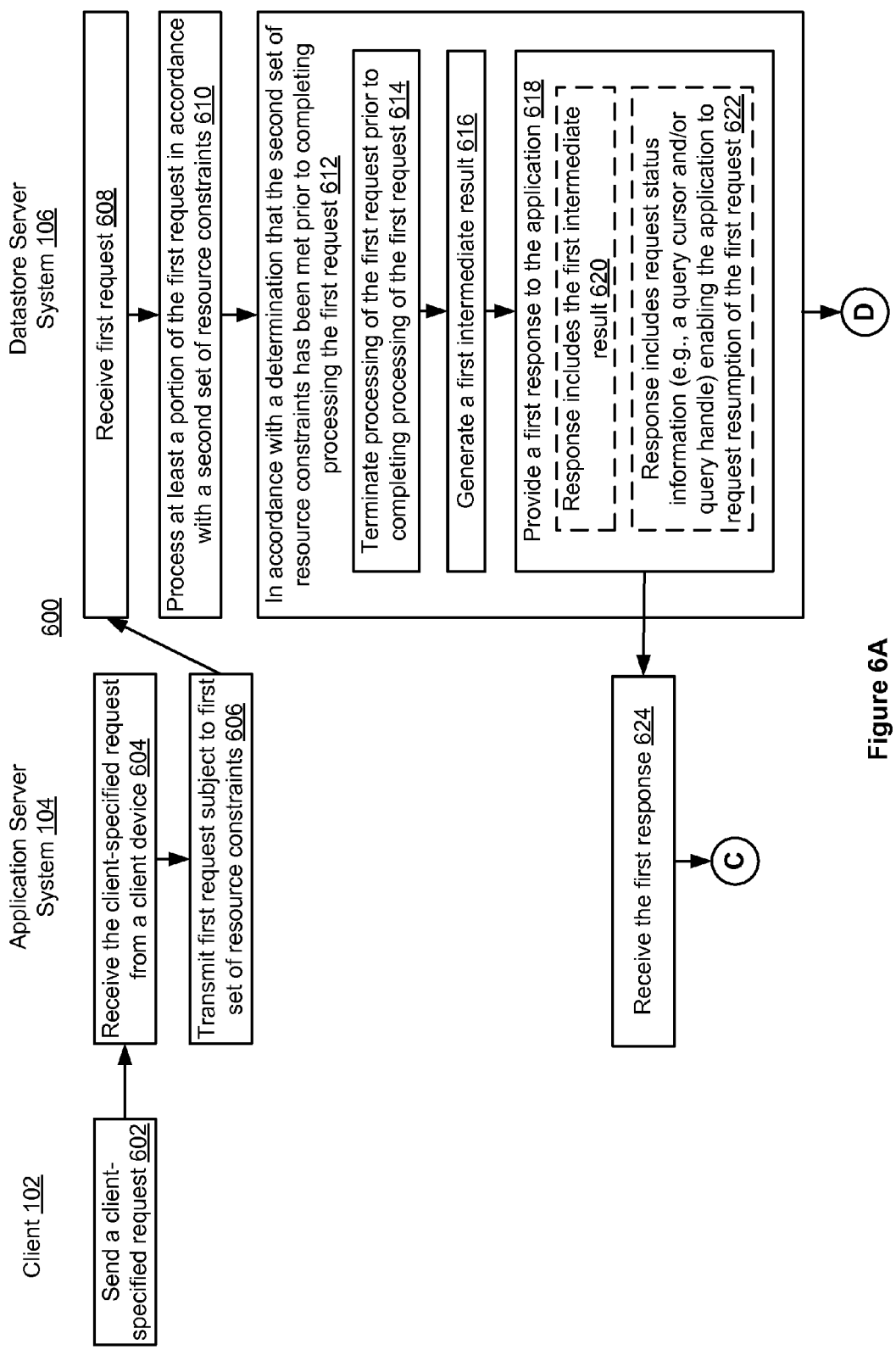
FIGS. 6A-6B include a flow chart illustrating a method of processing requests that are subject to resource constraints, in accordance with some embodiments.
Figure 6B:
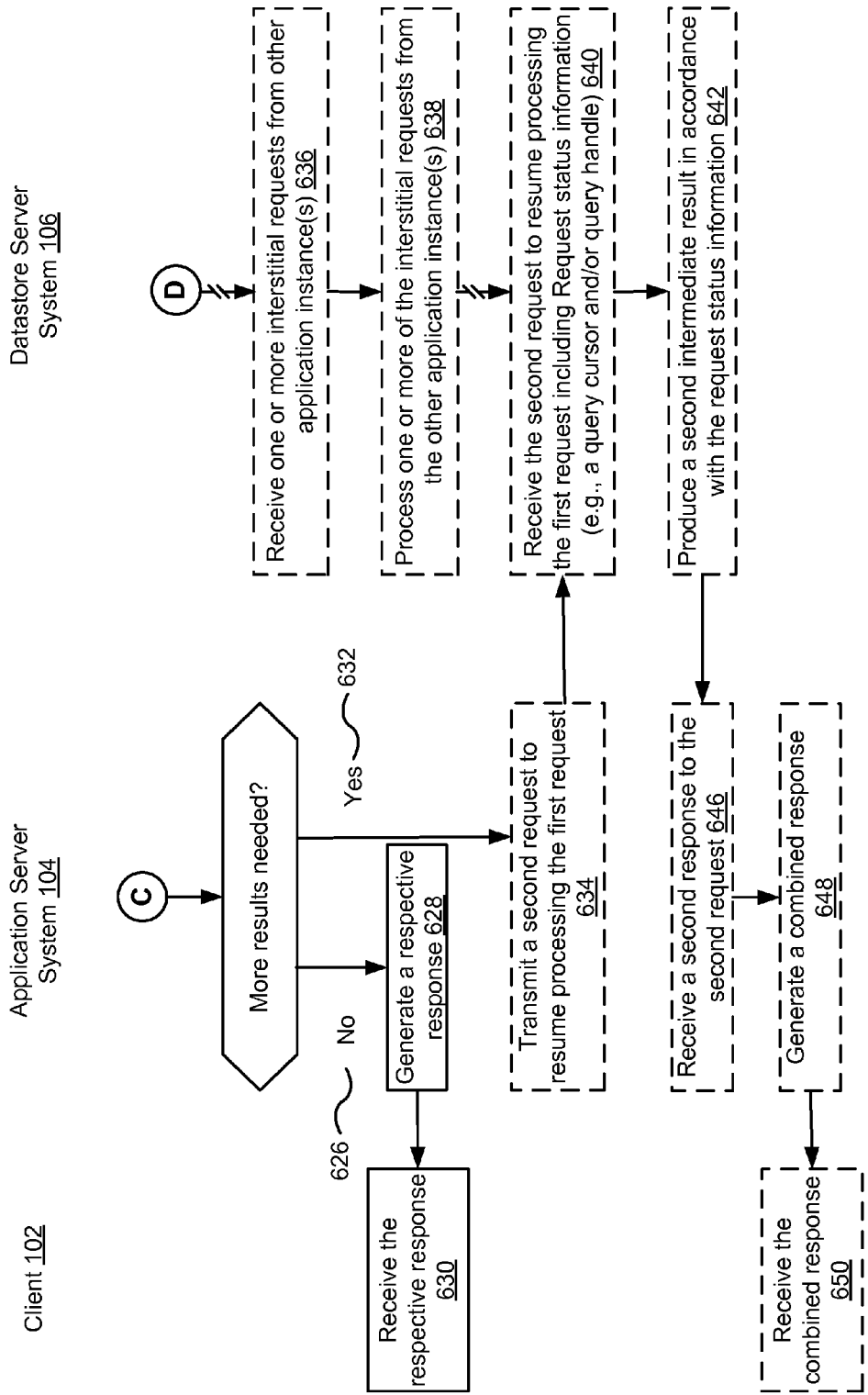

FIGS. 6A-6B include a flowchart representing a method 600 for processing requests that are subject to resource constraints, according to certain embodiments. Method 600 is, optionally, governed by instructions that are stored in a non-transitory computer readable storage medium and that are executed by one or more processors of one or more computer systems (e.g., Client 102, App Server 104 or Datastore Server 106). Each of the operations shown in FIGS. 6A-6B typically corresponds to instructions stored in a computer memory or non-transitory computer readable storage medium (e.g., memory 206 of Client 102 in FIG. 2, memory 306 of App Server 104 in FIG. 3 or memory 406 of Datastore Server 106 in FIG. 4). The computer readable storage medium optionally (and typically) further includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted by one or more processors. In various embodiments, some operations in method 600 are combined and/or the order of some operations is changed from the order shown in FIGS. 6A-6B.

In some embodiments, Client 102 sends (602) a client-specified request (e.g., a request generated based on user interactions with Client 102) to App Server 104. App Server 104 receives (604) the client-specified request from a client device (e.g., Client 102). App Server 104 transmits (606) first request to Datastore Server 106, subject to first set of resource constraints. In some embodiments, the first set of resource constraints are imposed on the application by App Server 104 such that exceeding the first set of resource constraints will cause the application instance to be terminated. For example, if the time taken by Datastore Server 106 to execute the request from the application instance exceeds a predefined time constraint, the application instance would be terminated. Alternatively or in addition a size or number of results returned by Datastore Server 106 exceeding a predefined size constraint will cause the application instance to be terminated by App Server 104.

Datastore Server 106 receives (608) first request from App Server 104. Datastore Server 106 processes (610) at least a portion of the first request in accordance with a second set of resource constraints. In some embodiments, only the first set of resource constraints or the second set of resource constraints are applied. In other embodiments, both the first set of resource constraints and the second set of resource constraints are applied to the request. In some implementations where both the first set of resource constraints and the second set of resource constraints are applied, the second set of resource constraints are enforced by Datastore Server 106 and are more restrictive than the first set of resource constraints imposed by App Server 104. In some embodiments, the second set of resource constraints are selected with knowledge of the first set of resource constraints so as to prevent overloading App Server 104 with a quantity of results (i.e., having a storage size) or processing time that exceeds the constraints for an application instance that are enforced by App Server 104.

In some circumstances, the request will be completed, without reaching the second set of resource constraints, in which case a complete set of results is transmitted to App Server 104. However, in some circumstances, in accordance with a determination (612) that the second set of resource constraints has been met prior to completing processing the first request, Datastore Server 106 terminates (614) processing of the first request prior to completing processing of the first request and generates (616) a first intermediate result. In the two examples described above with respect to FIG. 5B, the intermediate results corresponding to the two different sets of resource constraints correspond to Result 1 (e.g., entity 1) and Result 2 (e.g., entity 1 and entity 30).

After generating the first intermediate result, Datastore Server 106 provides (618) a first response to the application. In some embodiments, the response includes (620) the first intermediate result. In some embodiments, the response includes (622) Request Status Information 146 (e.g., a query cursor and/or query handle) enabling the application to request resumption of the first request. In the first example described above with respect to FIG. 5B, where processing is terminated at T1, the response includes the query cursor corresponding to Approximate State Information 432-a and the query handle corresponding to a unique identifier for Detailed State Information 430-a. As another example, in the second example described above with respect to FIG. 5B, where processing is terminated at T2, the response includes the query cursor corresponding to Approximate State Information 432-b and the query handle corresponding to a unique identifier for Detailed State Information 430-b.

App Server 104 receives (624) the first response. App Server 104 makes a determination as to whether more results are needed. Upon determining that more results are not needed (626), App Server 104 generates (628) a respective response and sends the respective response to Client 102. Client 102 receives (630) the respective response from App Server 104. In contrast, upon determining that more results are needed (632), App Server 104 transmits (634) a second request to Datastore Server 106 to resume processing the first request. For example, in a situation where Client 102 requested a view of an email inbox, and App Server 104 requested information corresponding to all messages in the users inbox, but only received information concerning the twenty most recent messages in the first response, when the inbox view requested by Client 102 includes only the twenty most recent messages, the information from the first response can be used to provide a response to the client corresponding to the inbox view. In contrast, in this example, when the inbox view requested by Client 102 includes more than twenty messages or messages other than the twenty most recent messages, App Server 104 will not be able to generate a complete inbox view and thus sends an additional request to Datastore Server 106 for the messages that are still needed to respond to Client 102 with the requested inbox view.

In some embodiments, during the time that Datastore Server 106 is communicating back and forth with App Server 104, Datastore Server 106 receives (636) one or more interstitial requests from other application instance(s) and processes (638) one or more of the interstitial requests from the other application instance(s). In other words, the resource constraints that are enforced by Datastore Server 106 enable Datastore Server 106 to enforce fairness in requests by limiting the resources that are expended by Datastore Server 106 to process a request (e.g., any one request) at a particular time (e.g., by breaking up requests that meet and/or exceed the resource constraints). In some embodiments, Datastore Server 106 imposes a predefined timeout period (e.g., a predefined amount of time between 0.1 seconds and 1.0 seconds, or some other reasonable time period) after a request has exceeded some resource constraint before the request can be resumed. In other embodiments, the delay that occurs between sending the first set of partial results and receiving the request to resume processing the first request is sufficient to enforce fairness between different application instances and thus a predefined timeout period is not explicitly imposed on requests to resume processing a request. Rather, the de facto timeout period is the amount of time it takes for the application instance to respond to a set of intermediate results with a request to resume processing the first request.

After App Server 104 has determined that more results are needed, Datastore Server 106 receives (640) the second request to resume processing the first request including Request Status Information 146 (e.g., a query cursor and/or query handle). Datastore Server 106 produces (642) a second intermediate result in accordance with the Request Status Information 146. For example, with respect to FIG. 5B, having access to the query handle would enable Datastore Server 106 to retrieve detailed state information and resume processing the first request in accordance with the detailed state information. Similarly, having access to the query cursor would enable Datastore Server 106 to retrieve or re-generate approximate state information and resume processing the first request in accordance with the approximate state information.

In some embodiments, a request is preferentially resumed using detailed state information. Thus, in some implementations, if a request includes both a query handle (associated with detailed state information) and a query cursor (associated with approximate state information), Datastore Server 106 first attempts to resume processing the first request using the detailed state information associated with the request. However, when detailed state information associated with the request cannot be located (e.g., because the detailed state information associated with the received query handle has been deleted in accordance with a detailed state information deletion policy or has been lost when a server storing the detailed state information crashed), approximate state information associated with the query cursor is used to resume processing the first request as a partial substitute for the detailed state information. Thus, while the detailed state information enables Datastore Server 106 to resume processing requests quickly, efficiently and accurately, the approximate state information serves as a fallback set of state information that enables Datastore Server 106 to resume processing requests without duplicating previously matched entities (although possibly redoing some of the processing that was previously done by Datastore Server 106 to process the request the first time).

In the first example described above with reference to FIG. 5B, if Datastore Server 106 receives the query handle corresponding to Detailed State Information 430-a, and is able to access to Detailed State Information 430-a, Datastore Server 106 resumes processing (in response to the second request) at step 550-g. However, if the second request either does not include the query handle associated with Detailed State Information 430-a or Datastore Server 106 cannot locate Detailed State Information 430-a, Datastore Server 106 resumes processing using Approximate State Information 432-a (which is, optionally, included in the received query cursor) at step 550-c.

After Datastore Server 106 has produced the second intermediate result, App Server 104 receives (646) a second response from Datastore Server 106 to the second request (e.g., an additional set of partial results). App Server 104 generates (648) a combined response based on the first response and the second response (e.g., merging at least respective portions of the two partial sets of results). As one example, App Server 104 combines some or all of the partial results obtained from Datastore Server 106 in response to that particular query or request to generate the combined response. Client 102 receives (650) the combined response.

It should be understood that FIGS. 6A-6B illustrate an embodiment where a backend application running on App Server 104 serves as an intermediary between Client 102 and Datastore Server 106. However in some embodiments, Client 102 has capabilities and instructions enabling it to perform the steps that are described as being performed by the App Server 104 above (e.g., Client 102 includes an application that communicates with Datastore Server 106 without using an intermediary application at another server system).

It should be understood that the particular order in which the operations in FIGS. 6A-6B have been described are merely examples and are not intended to indicate that the described order is the only order in which the operations could be performed. One of ordinary skill in the art would recognize various ways to reorder the operations described herein. Additionally, it should be noted that details of other processes described herein with respect to method 700 and method 800 (described herein with reference to FIGS. 7A-7C and 8A-8B, respectively) are also applicable in an analogous manner to method 600 described above with respect to FIGS. 6A-6B. For example, the entities, index(es), requests, responses and resource constraints described above with reference to method 600 may have one or more of the characteristics of the various the entities, index(es), requests, responses and resource constraints described herein with reference to method 700 and method 800. For brevity, these details are not repeated here.

Processing Requests According to Resource Constraints

Figure 7A:
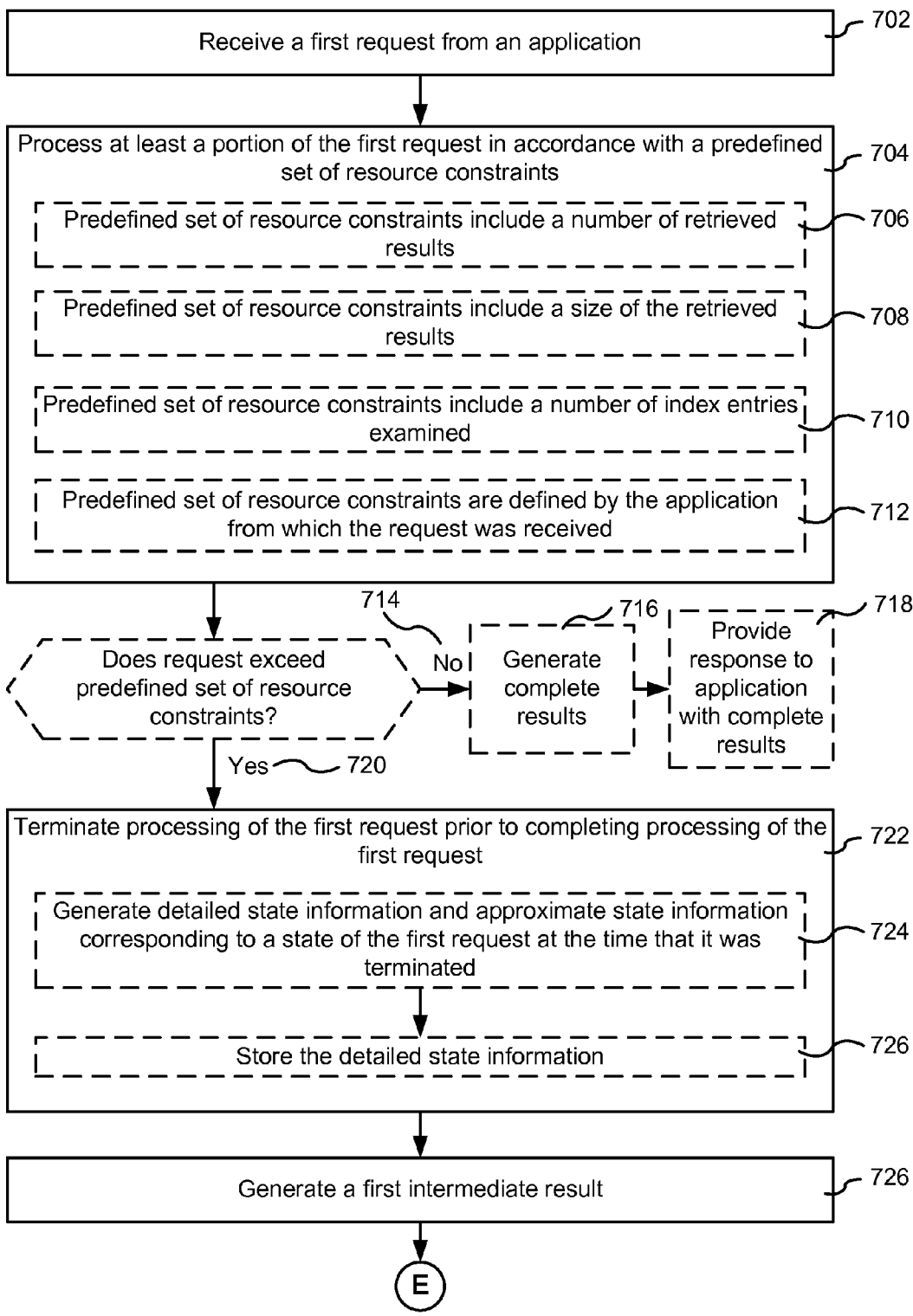
FIGS. 7A-7C include a flow chart illustrating a method performed at a datastore server system for processing requests that are subject to resource constraints, in accordance with some embodiments.
Figure 7B:
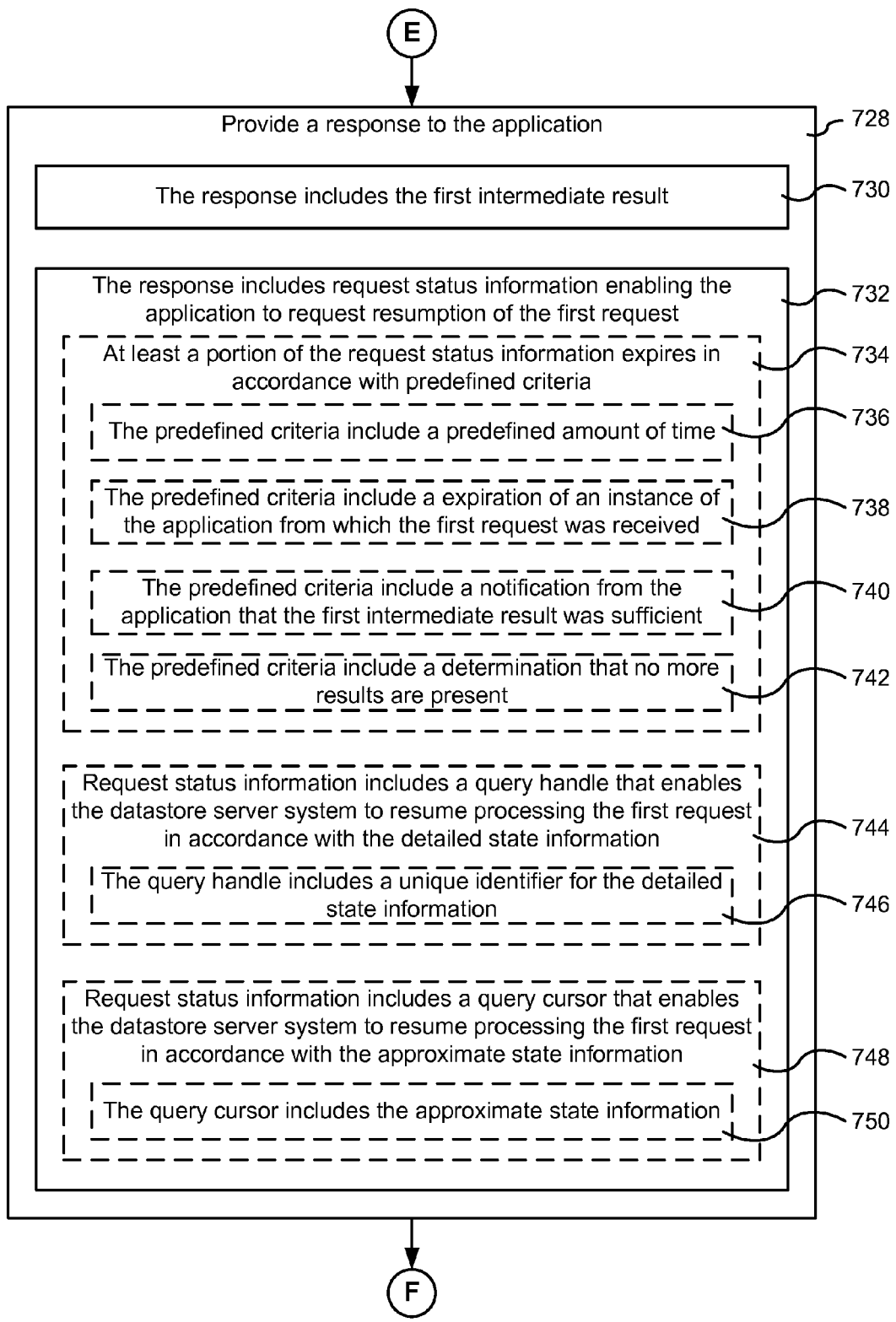
Figure 7C:
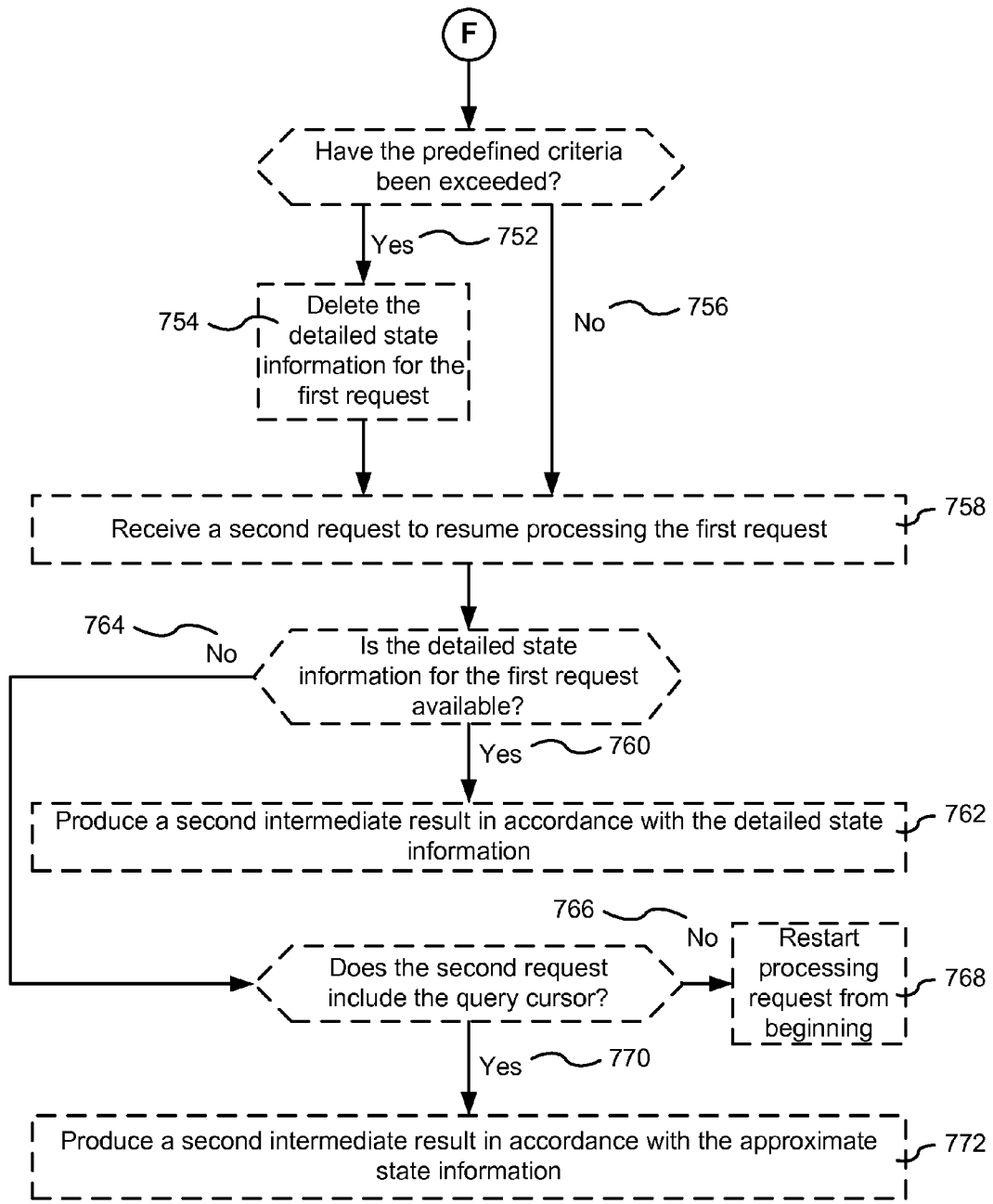

FIGS. 7A-7C include a flowchart representing a method 700 for processing requests that are subject to resource constraints, according to certain embodiments. Method 700 is, optionally, governed by instructions that are stored in a non-transitory computer readable storage medium and that are executed by one or more processors of one or more servers (e.g., Datastore Server System 106, FIG. 4). Each of the operations shown in FIGS. 7A-7C typically corresponds to instructions stored in a computer memory or non-transitory computer readable storage medium (e.g., memory 406 of Datastore Server 106 in FIG. 4). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted by one or more processors. In various embodiments, some operations in method 700 are combined and/or the order of some operations is changed from the order shown in FIGS. 7A-7C.

Datastore Server 106 receives (702) a first request from an application (e.g., a data processing request such as a request to retrieve or perform an operation on data entities meeting one or more criteria specified in the request). Datastore Server 106 processes (704) at least a portion of the first request in accordance with a predefined set of resource constraints. In some embodiments, the predefined set of resource constraints include (706) a number of retrieved results. In some embodiments, the predefined set of resource constraints includes (708) a resource constraint corresponding to a size of the retrieved results (e.g., a number of data items retrieved and/or a total size of retrieved data items). In some embodiments, the predefined set of resource constraints includes (710) a resource constraint corresponding to a number of index entries examined. In some embodiments, one or more other resource constraints (such as time spent by Datastore Server 106 processing the first request) are used in addition to, or instead of, the resource constraints described previously.

In some embodiments, the predefined set of resource constraints are defined (712) by the application or computer system (e.g., App Server 104) from which the request was received. These resource constraints can be defined on a per-request basis (e.g., different requests from the same application instance include different sets of resource constraints) or on a per-application basis (e.g., the requests from a particular application or set of applications are subject to a particular set of resource constraints). Using resource constraints defined by the application enables the application to set resource constraints that prevent instances of the application from being terminated due to processing by Datastore Server 1006 exceeding the application instance's resource constraints. For example, the resource constraints provided to Datastore Server 106 would typically have resource limits that are lower than, and certainly no greater than corresponding resource limits applicable to the application instance. In some embodiments, the predefined set of resource constraints are defined by Datastore Server 106. In some embodiments, the same predefined set of resource constraints are enforced by Datastore Server 106 on a plurality of different applications so as to enforce fairness between resource usage of the plurality of different applications.

In some embodiments, after processing at least a portion of the first request, Datastore Server 106 makes a determination whether the predefined set of resource constraints has been exceeded by the request. If the predefined set of resource constraints has not been (714) exceeded, Datastore Server 106 generates (716) complete results and provides (718) a response to the requesting application (sometimes called the requesting application instance) with complete results. For example, if the predefined set of resource constraints is a size limit on the retrieved results, and the results generated in response to the request do not exceed the size limit defined by the resource constraints, then Datastore Server 106 generates the complete results and provides a response to the requesting application with the complete results.

However, if the predefined set of resource constraints is (720) exceeded prior to completing processing the first request, Datastore Server 106 terminates (722) processing of the first request prior to completing processing of the first request. In some embodiments, terminating processing of the first request includes generating (724) detailed state information and approximate state information corresponding to a state of the first request at the time that Datastore Server 106 terminated processing the request. In some implementations, Datastore Server 106 stores (726) the detailed state information at the server system. As described above with reference to FIG. 5B, in the first example, the predefined set of resource constraints are met (and/or exceeded) after executing step 550-f and before executing step 550-g. As described previously, in this example, Datastore Server 106 generates Approximate State Information 432-a and Detailed State Information 430-a corresponding to the state of the first request at the time it was terminated in accordance with the predefined set of resource constraints. Similarly, in the second example, the predefined set of resource constraints are met (and/or exceeded) after executing step 550-I and before executing step 550-j. As described previously, in this example, Datastore Server 106 generates Approximate State Information 432-b and Detailed State Information 430-b corresponding to the state of the first request at the time it was terminated.

After terminating processing of the first request, Datastore Server 106 generates (726) a first intermediate result and provides (728) a response to the requesting application based on the first intermediate result. For example, as described above in relation to FIG. 5B, in the first example, the first intermediate results would be Result 1 (including Entity 1). Similarly, in the second example, the first intermediate results would be Result 2 (including Entity 1 and Entity 30).

The response includes (730) the first intermediate result and also includes (732) request status information enabling the application to request resumption of the first request. In some embodiments, the response includes an explicit indication that processing of the first request was terminated prior to completing processing of the first request. In other embodiments, the presence of request status information serves as an implicit indication that the first request was terminated prior to completing processing of the first request.

In some embodiments, at least a portion of the request status information expires (734) in accordance with predefined criteria. In some implementations, the predefined criteria include (736) a predefined amount of time (e.g., an amount of time between one second and five minutes, or some other reasonable time period). In some implementations, the predefined criteria include (738) expiration (or termination) of an instance of the application from which the first request was received (e.g., an explicit indication that the application has terminated, or a determination that no requests have been received from the instance of the application for more than a predefined time period). In some implementations, the predefined criteria include (740) receipt of a notification from the application that the first intermediate result was sufficient. In some implementations, the predefined criteria include (742) a determination that no more results are present (e.g., further processing of the request will not produce any additional results).

In some embodiments, the request status information includes (744) a query handle that enables Datastore Server 106 to resume processing the first request in accordance with the detailed state information. In some implementations, the query handle includes (746) a unique identifier for the detailed state information. It should be understood that, in some implementations where there are multiple datastore server systems and the detailed state information is specific to the respective datastore server (e.g., Datastore Server 106) that saved the detailed state information, and consequently any request to resume the processing using the handle will be directed to the respective datastore server that initially processed the request and saved the detailed state information.

In some embodiments, the request status information includes (748) a query cursor that enables Datastore Server 106 to resume processing the first request in accordance with the approximate state information. In some implementations, the query cursor includes (750) the approximate state information. For example, the query cursor includes an identifier for a last result returned in response to the first request. As another example, the query cursor includes information identifying an index and index entry used to identify a last result returned in response to the first request.

In some implementations, after providing the intermediate result to the instance of the application, Datastore Server 106 makes a determination as to whether or not the predefined criteria have been exceeded. If the predefined criteria have (752) been exceeded, Datastore Server 106 deletes (754) the detailed state information for the first request. In other words, in some implementations, when Datastore Server 106 determines that it is unlikely that the application will request resumption of processing of a respective request, Datastore Server 106 deletes the detailed state information associated with the respective request in order to conserve data storage resources (e.g., storage space in low-latency, high-speed memory).

In some embodiments, after providing the response including the first intermediate result to the application, Datastore Server 106 receives (758) a second request to resume processing the first request. In response to receiving the second request, Datastore Server 106 makes a determination as to whether or not the detailed state information for the first request is available (e.g., based on an identifier for the detailed state information included in a query handle). It should be understood that, in some situations, an application instance will send a request to resume processing a prior request with a query handle even though the detailed state information associated with the query handle has been deleted, because the application instance does not know whether or not the detailed state information has been deleted. In some embodiments, the query handle will not be included in a subsequent request if the application instance is aware that the detailed state information associated with the query handle has been deleted (e.g., due to a determination that the query handle has an age that is greater than a predefined age limit).

In contrast, if the detailed state information for the first request is (760) available, Datastore Server 106 produces a second intermediate result in accordance with the detailed state information. By using the detailed state information, Datastore Server 106 resumes processing the first request at the point where it left off and is thus able to quickly and efficiently continue processing the first request. In contrast, if the detailed state information for the first request is not (764) available (e.g., because the detailed state information has been deleted, or because the second request does not include a query handle associated with the detailed state information), Datastore Server 106 determines whether a query cursor and associated approximate state information can be used to continue processing the query, as described in greater detail below.

In response to receiving the second request when detailed state information for the first request is not available (e.g., because the detailed state information has been deleted or otherwise lost), Datastore Server 106 makes a determination as to whether the second request includes the query cursor. In some implementations, if the second request does not include (766) the query cursor, Datastore Server 106 restarts (768) processing the request from the beginning (e.g., because Datastore Server 106 does not have any request state information indicating where the previous attempt to process the first request was terminated). However, if the second request does include (770) the query cursor, Datastore Server 106 produces (772) a second intermediate result in accordance with the approximate state information. It should be understood that, in some embodiments, a second request to resume processing the first request that includes a query handle and does not include a query cursor will only be able to resume processing the first request if the detailed state information has not been deleted. In other words, in some implementations, in a situation where the detailed state information has been deleted and there is no query cursor included in the request, the server system will be unable to resume processing the first request.

It should be understood that the particular order in which the operations in FIGS. 7A-7C have been described are merely examples and are not intended to indicate that the described order is the only order in which the operations could be performed. One of ordinary skill in the art would recognize various ways to reorder the operations described herein. Additionally, it should be noted that details of other processes described herein with respect to method 600 and method 800 (described herein with reference to FIGS. 6A-6B and FIGS. 8A-8B, respectively) are also applicable in an analogous manner to method 700 described above with respect to FIGS. 7A-7C. For example, the entities, index(es), requests, responses and resource constraints described above with reference to method 700 may have one or more of the characteristics of the various entities, index(es), requests, responses and resource constraints described herein with reference to method 600 and/or method 800. For brevity, these details are not repeated here.

Requesting Processing of Requests that are Subject to Resource Constraints

Figure 8A:
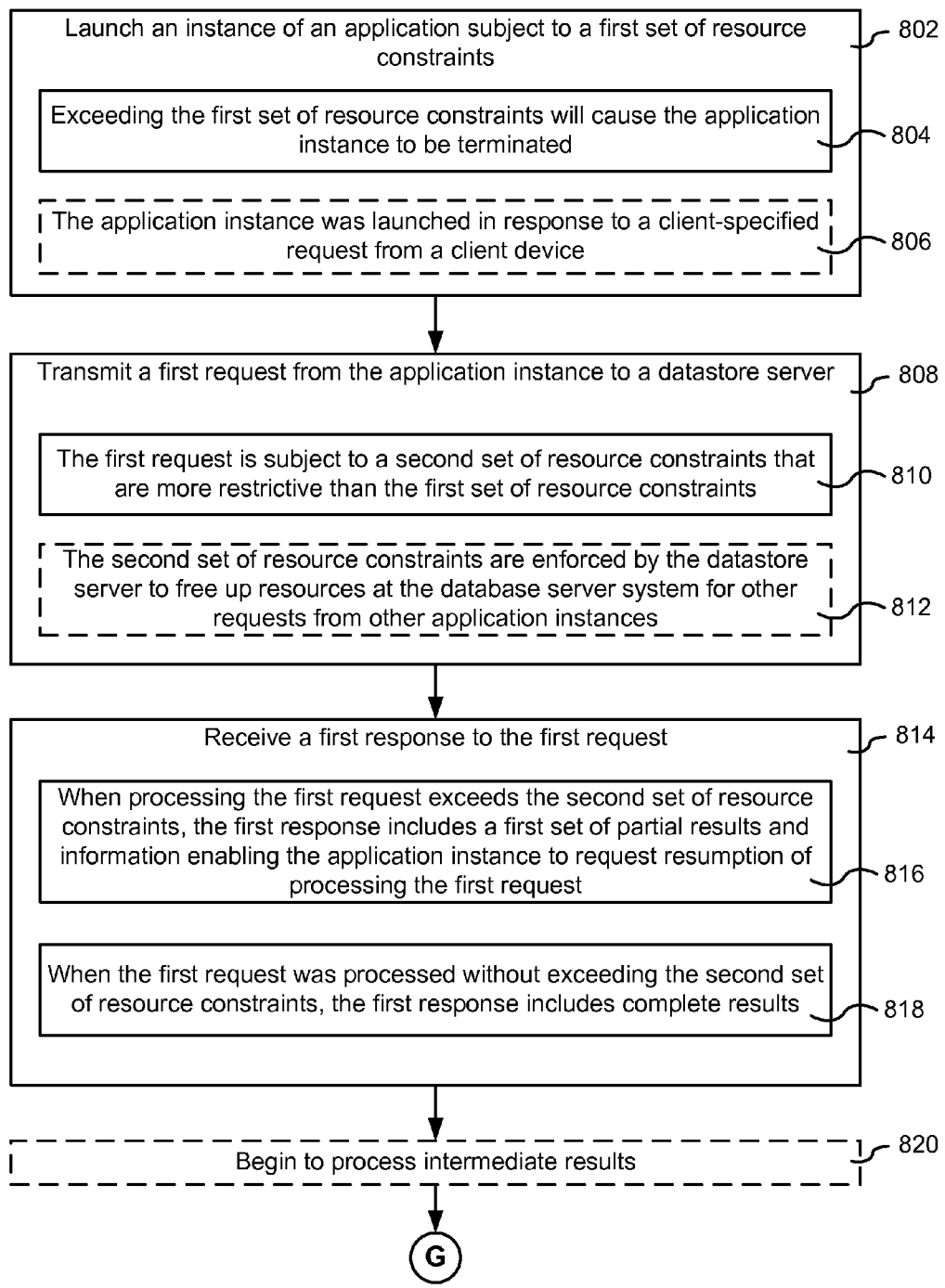
FIGS. 8A-8B include a flow-chart illustrating a method performed at an application server system for processing requests that are subject to resource constraints, in accordance with some embodiments.
Figure 8B:
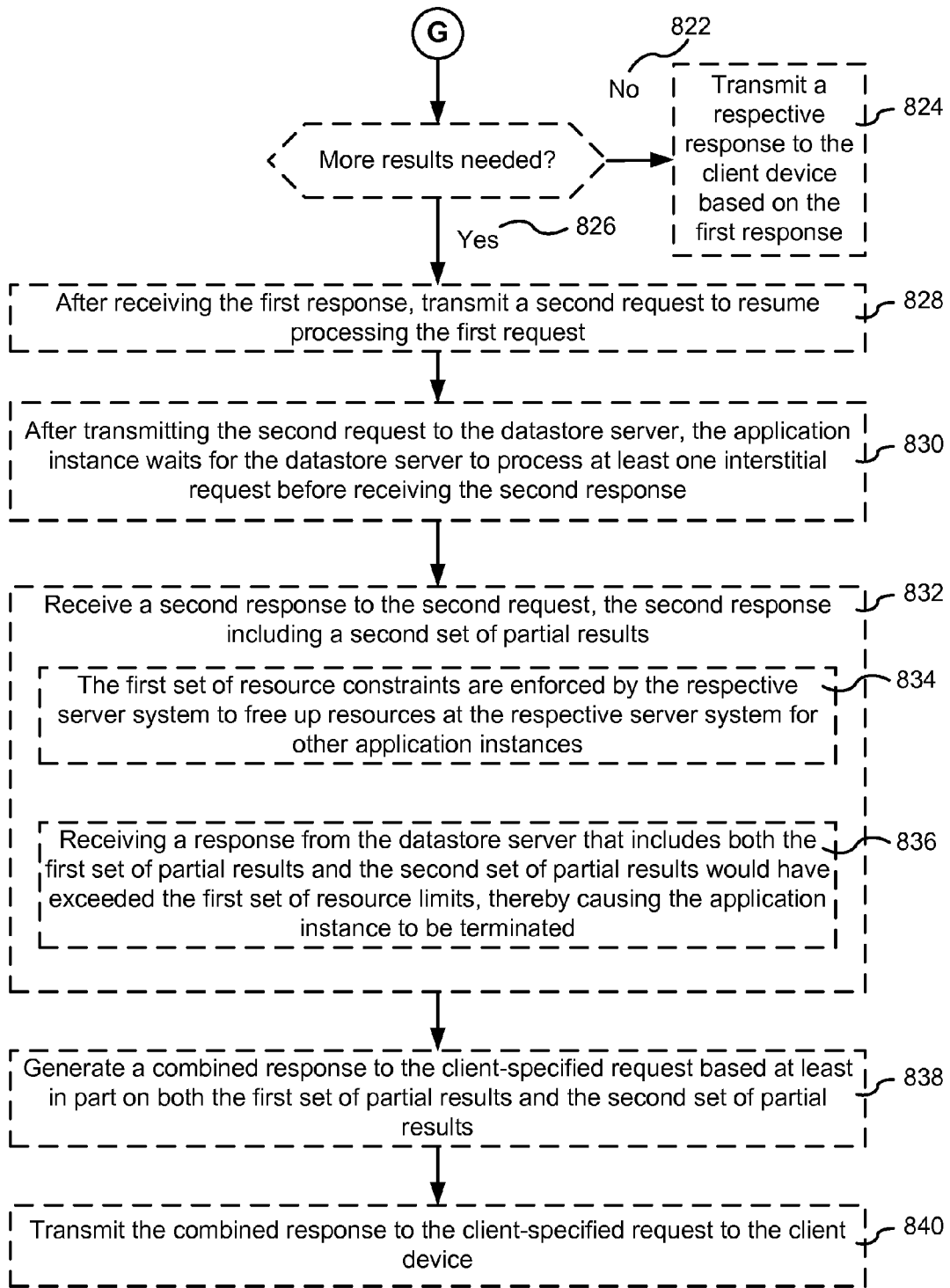

FIGS. 8A-8B include a flowchart representing a method 800 for processing requests that are subject to resource constraints, according to certain embodiments. Method 800 is, optionally, governed by instructions that are stored in a non-transitory computer readable storage medium and that are executed by one or more processors of one or more servers (e.g., App Server System 104, FIG. 3). Each of the operations shown in FIGS. 8A-8B typically corresponds to instructions stored in a computer memory or non-transitory computer readable storage medium (e.g., memory 306 of App Server 104 in FIG. 3). The computer readable storage medium optionally (and typically) includes a magnetic or optical disk storage device, solid state storage devices such as Flash memory, or other non-volatile memory device or devices. The computer readable instructions stored on the computer readable storage medium typically include one or more of: source code, assembly language code, object code, or other instruction format that is interpreted by one or more processors. In various embodiments, some operations in method 800 are combined and/or the order of some operations is changed from the order shown in FIGS. 8A-8B.

App Server 104 launches (802) an instance of an application subject to a first set of resource constraints. In some embodiments, exceeding (804) the first set of resource constraints will cause the application instance to be terminated. For example, if the first set of resource constraints is a size limit on retrieved results, then retrieved results that exceed the size limit would cause the first set of resource constraints to be exceeded and would cause the application instance to be terminated. In some embodiments, the application instance was launched (806) in response to a client-specified request from a client device (e.g., Client 102).

In some embodiments, App Server 104 is associated with one or more applications. In some embodiments, multiple instances of a single application are running at App Server 104 at the same time or at different times. In some implementations a respective instance of an application running at App Server 104 is associated with a predefined set of one or more client applications. Thus, in some situations App Server 104 will run two instances of the same application to communicate with different client applications (e.g., a first client application and a second client application). Thus, if a first client application requests that a first instance of the application at App Server 104 perform an operation that results in the first instance of the application being terminated, the second instance of the application will not also be terminated and thus the second client (which did not submit termination-causing request to the second instance of the application) will be able to continue to communicate normally with the second instance of the application.

After launching the application instance, and, in some implementations, receiving a client-specified request, App Server 104 transmits (808) a first request from the application instance to Datastore Server 106 (e.g., a request based on the client-specified request). The first request is (810) subject to a second set of resource constraints that are more restrictive than the first set of resource constraints. For example, when the first and second set of resource constraints are a limit on the size of retrieved results, then the second set of resource constraints limits the results to a smaller size (more stringent) than the first set of resource constraints. In some embodiments, the second set of resource constraints are (812) enforced by Datastore Server 106 to free up resources at Datastore Server 106 for other requests from other application instances (e.g., other instances of the same application and/or instances of one or more other applications). In some embodiments, after terminating the first request and prior to processing a second request, as described in greater detail below, Datastore Server 106 processes one or more other requests from other application instances (e.g., using computing resources freed up by enforcing the second set of resource constraints).

After transmitting the first request to Datastore Server 106, App Server 104 receives (814) a first response to the first request. When processing the first request exceeds (816) the second set of resource constraints, the first response includes a first set of partial results and information enabling the application instance to request resumption of processing the first request. For example, as described above in relation to FIG. 5B, in the first example, the first set of partial results would include Result 1 (including Entity 1), the query handle corresponding to Detailed State Information 430-*a* and the query cursor corresponding to Approximate State Information 432-*a*. The query handle and query cursor are information enabling the application instance to request resumption of processing of the first request, because the query handle and the query cursor both corresponds to the internal state of the request at Datastore Server 106 at the time it was terminated at Datastore Server 106.

When the first request was processed (e.g., by Datastore Server 106) without exceeding the second set of resource constraints, the first response includes complete results (818). In some circumstances, even when the first response does not include complete results, the first response to the first request is sufficient for responding to the client-specified request and thus App Server 104 does not request resumption of processing the first request. In some implementations, App Server 104 begins (820) to process intermediate results after they are received without waiting for additional results. In other words, when a complete set of results is not necessary to process intermediate results, App Server 104 (or the application instance running thereon) begins processing the intermediate results in conjunction with sending a request to Datastore Server 106 for additional results.

In some embodiments, after receiving the first response to the first request, App Server 104 makes a determination as to whether more results are needed. If more results are not (822) needed (e.g., because the request has been canceled or because the intermediate results returned in response to the first request were sufficient), then App Server 104 transmits (824) a respective response to the client device (e.g., Client 102) based on the first response. Optionally, App Server 104 also transmits a completion message to Datastore Server 106, enabling Datastore Server 106 to delete the detailed state information 430 associated with the first request. On the other hand, if more results are (826) needed after receiving the first response, App Server 104 transmits (828) a second request to resume processing the first request. In some embodiments, after transmitting the second request to Datastore Server 106, the requesting application instance waits (830) for Datastore Server 106 to process at least one interstitial request before receiving the second response.

In some implementations, after transmitting the second request to Datastore Server 106, App Server 104 receives (832) a second response to the second request, where the second response includes a second set of partial results (e.g., a set of partial results that continue from where the first set of partial results left off). In some embodiments, the first set of resource constraints are enforced (834) by the respective server system (e.g., App Server 104) in order to free up resources (e.g., computing resources) at the respective server system for other application instances (e.g., other instances of the same application and/or instances of one or more other applications).

In some embodiments, the first and second sets of partial results have characteristics (e.g., size, processing resource requirements, etc.) such that receiving a response from Datastore Server 106 that included both the first set of partial results and the second set of partial results would have exceeded the first set of resource limits (836), thereby causing the application instance to be terminated by App Server 104. Consequently, in these embodiments, by ensuring that responses conform to the second set of resource limits that are more restrictive than the first set of resource constraints, Datastore Server 106 effectively ensures that the responses will not exceed the first set of resource constraints, thereby reducing the likelihood that the application instance will exceed the first set of resource constraints and be terminated. In other words, instead of being abruptly terminated because a response from Database Server 106 exceeded the resource limits enforced by App Server 104, the application instance will receive a partial set of results that does not cause the application instance to be terminated and is thus able to either use the partial results, save a state corresponding to the partial results and/or request additional results.

For example, if the application instance has a memory limit of 300 Mb at App Server 104 (e.g., the application instance is restricted from storing more than 300 Mb of data), receiving a response including 400 Mb of data would cause the application instance to be terminated for exceeding the memory limit. However, continuing this example, if the application instance received two responses that are each 200 Mb in size, the application instance would have the opportunity to process the first 200 Mb response prior to receiving the second 200 Mb response (e.g., by sending some or all of the received data to a client application or extracting relevant information from the received data and deleting unneeded data from the memory allocated to the application instance on App Server 104). If the application instance is able to delete a sufficient amount of the data (e.g., enough data to reduce the amount of data stored by the application instance to less than 100 Mb), the application instance will avoid exceeding the 300 Mb memory limit and thereby avoid being terminated for exceeding the memory limit after receiving the second 200 Mb response. Additionally, in some implementations the application instance will wait until it has finished processing the first 200 Mb before submitting another request that could result in an additional 200 Mb response.

In some implementations the resource constraints enforced by Datastore Server 106 are substantially stricter than the resource constraints enforced by App Server 104. In some of these implementations the resource constraints are determined so that intermediate results from two responses can be processed simultaneously, and it would take three or more responses to exceed the resource constraints enforced by App Server 104 (thereby causing the application instance to be terminated). For example, in the situation described above where the memory limit enforced by App Server 104 is 300 Mb, the response size limit enforced by Datastore Server 106 would be less than 150 Mb (e.g., 1 Mb, 10 Mb or 50 Mb, depending on the request). Enforcing substantially stricter resource constraints at the Datastore Server 106 than at the App Server 104 is advantageous in many situations because it enables an application instance running at App Server 104 to submit a second request while still processing a response to a first request without exceeding the resource constraints enforced by the App Server 104 (in most situations). Thus, latency introduced by receiving multiple sets of intermediate results is hidden through parallelism (e.g., requesting additional intermediate results while still processing previously received intermediate results).

In some embodiments, after receiving the first and second sets of partial results (and optionally additional sets of partial results) App Server 104 generates (838) a combined response to the client-specified request based at least in part on both the first set of partial results and the second set of partial results. In some implementations, after generating the combined response, App Server 104 transmits the combined response to the client-specified request to the client device (e.g., Client 102) from which the client-specified request was received. For example, in a situation where the first and second requests were based on a client-specified request from Client 102, the combined response is sent back to Client 102.

It should be understood that the particular order in which the operations in FIGS. 8A-8B have been described are merely examples and are not intended to indicate that the described order is the only order in which the operations could be performed. One of ordinary skill in the art would recognize various ways to reorder the operations described herein. Additionally, it should be noted that details of other processes described herein with respect to method 600 and method 700 (described herein with reference to FIGS. 6A-6B and FIGS. 7A-7C, respectively) are also applicable in an analogous manner to method 800 described above with respect to FIGS. 8A-8B. For example, the entities, index(es), requests, responses and resource constraints described above with reference to method 800 may have one or more of the characteristics of the various entities, index(es), requests, responses and resource constraints described herein with reference to method 600 and/or method 700. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
at a respective server system having one or more processors and memory storing one or more programs that when executed by the one or more processors cause the respective server system to perform the method, the method comprising:
receiving a first request from an application;
processing at least a portion of the first request in accordance with a predefined set of resource constraints; and
in accordance with a determination that the predefined set of resource constraints has been met prior to completing processing the first request:
terminating processing of the first request prior to completing processing of the first request, wherein terminating processing of the first request includes generating detailed state information and approximate state information corresponding to a state of the first request at the time that it was terminated, and wherein the detailed state information includes additional processing state parameters in comparison with the approximate state information;
generating a first intermediate result; and
providing a response to the application including:
the first intermediate result; and
request status information enabling the application to request resumption of the first request, wherein the request status information includes:
a query handle that enables the server system to resume processing the first request in accordance with the detailed state information; and
a query cursor that enables the server system to resume processing the first request in accordance with the approximate state information;
receiving a second request to resume processing the first request, wherein the second request includes both the query handle and the query cursor;
in accordance with a determination that the detailed state information has not expired, utilizing the query handle to resume processing and forgoing utilizing the query cursor; and
in accordance with a determination that the detailed state information has expired, utilizing the query cursor to resume processing and forgoing utilizing the query handle.

2. The method of claim 1, wherein at least a portion of the request status information expires in accordance with predefined criteria selected from the set consisting of: a predefined amount of time, expiration of an instance of the application from which the first request was received, a notification from the application that the first intermediate result was sufficient, and a determination that no more results are present.

3. The method of claim 1, wherein:
the detailed state information is stored at the server system; and
the query handle includes a unique identifier for the detailed state information.

4. The method of claim 1, wherein the query cursor includes the approximate state information.

5. The method of claim 2, wherein the at least a portion of the request status information is the detailed state information.

6. The method of claim 5, further comprising, after the detailed state information has expired:
receiving a second request to resume processing the first request; and in accordance with a determination that the second request includes the query cursor, producing a second intermediate result in accordance with the approximate state information.

7. The method of claim 1, wherein the predefined set of resource constraints are selected from the set consisting of: a number of retrieved results, a size of the retrieved results and a number of index entries examined.

8. The method of claim 1, wherein the predefined set of resource constraints are defined by the application from which the request was received.

9. The method of claim 1, wherein the first intermediate result is not empty;
wherein the approximate state information comprises information for a first processing state, the first processing state corresponding to the first intermediate result;
wherein the detailed state information comprises information for a second processing state, the second processing state being subsequent to the first processing state; and
wherein the query cursor enables the server system to resume processing at the first processing state and wherein the query handle enables the server system to resume processing at the second processing state.

10. A server system, comprising:
one or more processors;
memory; and
one or more programs, wherein the one or more programs are stored in the memory and configured to be executed by the one or more processors, the one or more programs including instructions for:
receiving a first request from an application;
processing at least a portion of the first request in accordance with a predefined set of resource constraints; and
in accordance with a determination that the predefined set of resource constraints has been met prior to completing processing the first request:
terminating processing of the first request prior to completing processing of the first request, wherein terminating processing of the first request includes generating detailed state information and approximate state information corresponding to a state of the first request at the time that it was terminated, and wherein the detailed state information includes additional processing state parameters in comparison with the approximate state information;
generating a first intermediate result; and
providing a response to the application including:
the first intermediate result; and
request status information enabling the application to request resumption of the first request, wherein the request status information includes:
a query handle that enables the server system to resume processing the first request in accordance with the detailed state information; and
a query cursor that enables the server system to resume processing the first request in accordance with the approximate state information;
receiving a second request to resume processing the first request, wherein the second request includes both the query handle and the query cursor;
in accordance with a determination that the detailed state information has not expired, utilizing the query handle to resume processing and forgoing utilizing the query cursor; and
in accordance with a determination that the detailed state information has expired, utilizing the query cursor to resume processing and forgoing utilizing the query handle.

11. The system of claim 10, wherein at least a portion of the request status information expires in accordance with predefined criteria selected from the set consisting of: a predefined amount of time, expiration of an instance of the application from which the first request was received, a notification from the application that the first intermediate result was sufficient, and a determination that no more results are present.

12. The system of claim 10, wherein:
the detailed state information is stored at the server system; and
the query handle includes a unique identifier for the detailed state information.

13. The system of claim 10, wherein the query cursor includes the approximate state information.

14. The system of claim 11, wherein the at least a portion of the request status information is the detailed state information.

15. The system of claim 14, wherein the one or more programs further comprise instructions for, after the detailed state information has expired:
receiving a second request to resume processing the first request; and
in accordance with a determination that the second request includes the query cursor, producing a second intermediate result in accordance with the approximate state information.

16. A non-transitory computer readable storage medium storing one or more programs, the one or more programs comprising instructions, which when executed by a computer system with one or more processors, cause the computer system to:
receive a first request from an application;
process at least a portion of the first request in accordance with a predefined set of resource constraints; and
in accordance with a determination that the predefined set of resource constraints has been met prior to completing processing the first request:
terminate processing of the first request prior to completing processing of the first request, wherein terminating processing of the first request includes generating detailed state information and approximate state information corresponding to a state of the first request at the time that it was terminated, and wherein the detailed state information includes additional processing state parameters in comparison with the approximate state information;
generate a first intermediate result; and
provide a response to the application including:
the first intermediate result; and
request status information enabling the application to request resumption of the first request, wherein the request status information includes:
a query handle that enables the server system to resume processing the first request in accordance with the detailed state information; and
a query cursor that enables the server system to resume processing the first request in accordance with the approximate state information;
receive a second request to resume processing the first request, wherein the second request includes both the query handle and the query cursor;

in accordance with a determination that the detailed state information has not expired, utilize the query handle to resume processing and forgo utilizing the query cursor; and in accordance with a determination that the detailed state information has expired, utilize the query cursor to resume processing and forgo utilizing the query handle.

17. The non-transitory computer readable storage medium of claim 16, wherein at least a portion of the request status information expires in accordance with predefined criteria selected from the set consisting of: a predefined amount of time, expiration of an instance of the application from which the first request was received, a notification from the application that the first intermediate result was sufficient, and a determination that no more results are present.

18. The non-transitory computer readable storage medium of claim 16, wherein:

the detailed state information is stored at the server system; and the query handle includes a unique identifier for the detailed state information.

19. The non-transitory computer readable storage medium of claim 16, wherein the query cursor includes the approximate state information.

20. The non-transitory computer readable storage medium of claim 17, wherein the at least a portion of the request status information is the detailed state information.

21. The non-transitory computer readable storage medium of claim 20, wherein the one or more programs further comprise instructions to, after the detailed state information has expired:

receive a second request to resume processing the first request; and in accordance with a determination that the second request includes the query cursor, produce a second intermediate result in accordance with the approximate state information.

* * * * *